(12) United States Patent
Suzuki et al.

(10) Patent No.: US 12,513,260 B2
(45) Date of Patent: Dec. 30, 2025

(54) IMAGE PROJECTION DEVICE

(71) Applicant: QD LASER, INC., Kawasaki (JP)

(72) Inventors: Makoto Suzuki, Kawasaki (JP); Seiji Morino, Kawasaki (JP)

(73) Assignee: QD LASER, INC., Kawasaki (JP)

( * ) Notice: Subject to any disclaimer, the term of this patent is extended or adjusted under 35 U.S.C. 154(b) by 505 days.

(21) Appl. No.: 17/926,953

(22) PCT Filed: Jan. 12, 2022

(86) PCT No.: PCT/JP2022/000691
§ 371 (c)(1),
(2) Date: Nov. 21, 2022

(87) PCT Pub. No.: WO2022/201750
PCT Pub. Date: Sep. 29, 2022

(65) Prior Publication Data
US 2023/0199141 A1  Jun. 22, 2023

(30) Foreign Application Priority Data

Mar. 24, 2021 (JP) .................................. 2021-049848
Dec. 9, 2021 (JP) ................................ 2021-200033

(51) Int. Cl.
*H04N 5/74* (2006.01)
*G02B 26/08* (2006.01)
*G02B 26/10* (2006.01)

(52) U.S. Cl.
CPC ....... *H04N 5/7491* (2013.01); *G02B 26/0833* (2013.01); *G02B 26/101* (2013.01)

(58) Field of Classification Search
CPC .. H04N 13/322; H04N 13/344; H04N 13/383; H04N 13/398; H04N 9/312;
(Continued)

(56) References Cited

U.S. PATENT DOCUMENTS

2009/0190094 A1  7/2009  Watanabe et al.
2012/0242561 A1  9/2012  Sugihara
(Continued)

FOREIGN PATENT DOCUMENTS

EP   3690517 A1   8/2020
JP   2008-83539 A  4/2008
(Continued)

OTHER PUBLICATIONS

International Search Report for International Application No. PCT/JP2022/000691 dated Mar. 29, 2022 (5 sheets, 2 sheets translation, 7 sheets total).
(Continued)

*Primary Examiner* — Sultan Chowdhury
(74) *Attorney, Agent, or Firm* — Kratz, Quintos & Hanson, LLP

(57) ABSTRACT

An image projection device incudes a scanning unit that two-dimensionally scans a light beam emitted from a light source, a light guide member that is formed of a glass material through which light beams emitted from the scanning unit at different times pass, has reflection surfaces reflecting the light beams, converges the light beams reflected by the reflection surfaces at a first convergence point in the eye of the user, and then irradiates a retina of the user with the converged light beams, a first optical member that converges the light beams emitted from the scanning unit at a second convergence point before the light guide member and then causes the light beams to enter the light guide member, and a second optical member that is disposed at the second convergence point and causes the light beams to enter a last reflection surface as diffusion lights.

17 Claims, 17 Drawing Sheets

(58) Field of Classification Search
CPC .. H04N 9/3102; H04N 9/3105; H04N 9/3129; H04N 9/3141; H04N 9/3152; H04N 9/3173; G02B 27/0081; G02B 27/01; G02B 27/017; G02B 27/0101; G02B 27/0172; G02B 27/0178; G02B 27/0977; G02B 27/0983; G02B 27/14; G02B 27/18; G02B 26/00; G02B 26/007; G02B 26/0833; G02B 26/10; G02B 26/101

See application file for complete search history.

(56) References Cited

U.S. PATENT DOCUMENTS

| | | | |
|---|---|---|---|
| 2013/0077049 A1* | 3/2013 | Bohn | G02B 27/0093 351/210 |
| 2015/0061975 A1 | 3/2015 | Komatsu | |
| 2015/0178939 A1 | 6/2015 | Bradski et al. | |
| 2015/0277375 A1* | 10/2015 | Large | G03H 1/0248 359/34 |
| 2016/0178909 A1 | 6/2016 | Komatsu | |
| 2018/0322845 A1* | 11/2018 | Machida | G02B 27/0172 |
| 2019/0056600 A1 | 2/2019 | Danziger et al. | |
| 2019/0133437 A1* | 5/2019 | Sugawara | G02B 27/18 |
| 2019/0155337 A1* | 5/2019 | Ohkawa | G02B 27/0172 |
| 2020/0209629 A1 | 7/2020 | Suzuki et al. | |
| 2020/0249754 A1 | 8/2020 | Morozov et al. | |
| 2021/0173199 A1* | 6/2021 | Suzuki | G02B 26/101 |
| 2021/0239987 A1* | 8/2021 | Yonekubo | G02B 6/2848 |

FOREIGN PATENT DOCUMENTS

| | | |
|---|---|---|
| JP | 2012-203113 A | 10/2012 |
| JP | 2015-072438 A | 4/2015 |
| JP | 2017-500605 A | 1/2017 |
| JP | 2019-174663 A | 10/2019 |
| JP | 2020-504832 A | 2/2020 |
| WO | 2018/225322 A1 | 12/2018 |
| WO | 2019/065245 A1 | 4/2019 |

OTHER PUBLICATIONS

Written Opinion of the International Searching Authority for International Application No. PCT/JP2022/000691 dated Mar. 29, 2022 (5 sheets).

International Preliminary Report on Patentabillity (Chapter II) for International Application No. PCT/JP2022/000691 issued Oct. 5, 2023 (5 sheets).

Extended European Search Report for European Patent Application No. 22774555.1 dated Jul. 24, 2024 (5 sheets).

* cited by examiner

IMAGE PROJECTION DEVICE

TECHNICAL FIELD

The present invention relates to an image projection device.

BACKGROUND ART

There is known an image projection device that two-dimensionally scans a light beam emitted from a light source to irradiate the retina of a user with the scanned light beam by Maxwellian view to project an image. In addition, there has been proposed an image projection device using Maxwellian view capable of projecting a high-quality image in which distortion, defocus, and the like are reduced (for example. Patent Document 1).

PRIOR ART DOCUMENT

Patent Document

Patent Document 1: International Publication No. 2019/065245

SUMMARY OF THE INVENTION

Problem to be Solved by the Invention

When the image projection device disclosed in Patent Document 1 is attached to a frame that is worn on the user's face, such as a spectacle-type frame, the clearance between the image projection device and the user's face tends to be small.

The present invention has been made in view of above problems, and an object of the present invention is to provide an image projection device capable of securing sufficient clearance from the user's face.

Means for Solving the Problem

The present invention is an image projection device including: a light source; a control unit configured to generate an image light beam based on image data and control emission of the image light beam from the light source; a scanning unit that is attached to a frame to be worn on a face of a user and two-dimensionally scans the image light beam emitted from the light source; a light guide member that is attached to the frame and disposed in front of an eye of the user, is formed of a glass material through which a plurality of image light beams emitted from the scanning unit at different times pass, has a plurality of reflection surfaces that reflect the plurality of image light beams, converges the plurality of image light beams reflected by the plurality of reflection surfaces at a first convergence point in the eye of the user, and then irradiates a retina of the user with the converged image light beams; a first optical member that is attached to the frame and converges the plurality of image light beams emitted from the scanning unit at a second convergence point before the light guide member and then causes the plurality of image light beams to enter the light guide member, and a second optical member that is disposed at the second convergence point and causes each of the plurality of image light beams to enter a last reflection surface, which reflects the plurality of image light beams last among the plurality of reflection surfaces included in the light guide member, as diffusion light.

In the above configuration, a configuration in which the scanning unit and the first optical member are attached near a temple of the frame, and the light guide member is attached near a rim of the frame and has a shape extending from a front of the eye of the user toward the temple may be employed.

In the above described configuration, a configuration in which the light guide member has an odd number of reflection surfaces as the plurality of reflection surfaces, and the plurality of image light beams that are reflected by the first optical member and travel obliquely forward enter the light guide member may be employed.

In the above configuration, a configuration in which the last reflection surface of the plurality of reflection surfaces is a concave curved surface, and remaining reflection surfaces are substantially flat surfaces may be employed.

In the above configuration, a configuration in which the remaining reflection surfaces are substantially parallel to each other may be employed.

In the above configuration, a configuration in which the light guide member includes a main body portion through which the plurality of image light beams repeatedly reflected by the plurality of reflection surfaces and applied to the retina of the user pass, and a cover portion that covers the last reflection surface and has a refractive index substantially equal to that of the main body portion, the last reflection surface, an emission surface through which the plurality of image light beams reflected by the last reflection surface are emitted from the main body portion, and an opposite surface of the cover portion from the emission surface of the main body portion with respect to the last reflection surface are located in front of the eye of the user, the last reflection surface is a half mirror, and the emission surface of the main body portion and the opposite surface of the cover portion are flatter than the last reflection surface may be employed.

In the above configuration, a configuration in which the emission surface of the main body portion and the opposite surface of the cover portion are substantially parallel to each other and are substantially flat surfaces may be employed.

In the above configuration, a configuration in which a first reflection surface immediately before the last reflection surface among the plurality of reflection surfaces has a region on which both the plurality of image light beams reflected by a second reflection surface immediately before the first reflection surface and the plurality of image light beams reflected by the last reflection surface are incident, and reflects the plurality of image light beams reflected by the second reflection surface to the last reflection surface and transmits the plurality of image light beams reflected by the last reflection surface in the region may be employed.

In the above configuration, a configuration in which the first reflection surface is substantially orthogonal to an optical axis after a central image light beam corresponding to a center of an image projected on the retina of the user among the plurality of image light beams is reflected by the last reflection surface may be employed.

In the above configuration, a configuration in which a convergence angle at which the plurality of image light beams converge at the first convergence point is equal to or greater than a scanning angle of the plurality of image light beams by the scanning unit may be employed.

In the above configuration, a configuration in which the image light beam emitted from the light source travels obliquely forward from a side closer to the face of the user than the scanning unit and enters the scanning unit, and the plurality of image light beams emitted from the scanning unit travel rearward from the scanning unit, are then reflected obliquely forward by the first optical member to enter the light guide member may be employed.

In the above configuration, a configuration in which a housing that is attached to the frame and houses the scanning unit, the first optical member, and the second optical member therein is further provided, and most of the light guide member is not located in the housing may be employed.

In the above configuration, a configuration in which a first optical path length, a second optical path length, a third optical path length, and a fourth optical path length are shorter in this order, where the first optical path length is an optical path length of the image light beam between the second reflection surface and an incident surface through which the image light beam enters the light guide member, the second optical path length is an optical path length of the image light beam between the second reflection surface and the first reflection surface, the third optical path length is an optical path length of the image light beam between the first reflection surface and the last reflection surface, and the fourth optical path length is an optical path length of the image light beam between the last reflection surface and the first reflection surface as an emission surface of the light guide member may be employed.

In the above configuration, a configuration in which an incident angle at which the image light beam enters the first optical member is substantially the same as an incident angle at which the image light beam enters the last reflection surface, and an incident angle at which the image light beam enters the second reflection surface is substantially the same as an incident angle at which the image light beam enters the first reflection surface may be employed.

In the above configuration, a configuration in which some image light beams of the plurality of image light beams pass through the last reflection surface, then enter again an opposite surface of the last reflection surface and pass through the last reflection surface, are reflected by the last reflection surface, and are applied to the retina of the user, and remaining image light beams of the plurality of image light beams are reflected by the last reflection surface without passing through the last reflection surface, and are applied to the retina of the user, and a ratio of luminance of the some image light beams to luminance of the remaining image light beams is 80% or greater when the image light beams enter the eye of the user may be employed.

In the above configuration, a configuration in which some image light beams of the plurality of image light beams pass through the last reflection surface, then enter an opposite surface of the last reflection surface and pass through the last reflection surface, are reflected by the last reflection surface, and are applied to the retina of the user, and remaining image light beams of the plurality of image light beams are reflected by the last reflection surface without passing through the last reflection surface, and are applied to the retina of the user, and the reflectance of the last reflection surface is 15% or less may be employed.

The present invention is an image projection device including: a light source; a control unit configured to generate an image light beam based on image data and control emission of the image light beam from the light source; a scanning unit configured to two-dimensionally scan the image light beam emitted from the light source; and a light guide member that is formed of a glass material through which a plurality of image light beams emitted from the scanning unit at different times pass, has a plurality of reflection surfaces that reflect the plurality of image light beams, converges the plurality of image light beams reflected by a last reflection surface, which reflects the plurality of image light beams last among the plurality of reflection surfaces, at a convergence point in an eye of a user, and then irradiates a retina of the user with the converged image light beams, wherein some image light beams of the plurality of image light beams pass through the last reflection surface, then enter again an opposite side of the last reflection surface and pass through the last reflection surface, are reflected by the last reflection surface, and are applied to the retina of the user, and remaining image light beams of the plurality of image light beams are reflected by the last reflection surface without passing through the last reflection surface, and are applied to the retina of the user, and wherein a ratio of luminance of the some image light beams to luminance of the remaining image light beams is 80% or greater when the image light beams enter the eye of the user.

The present invention is provided an image projection device including: a light source, a control unit configured to generate an image light beam based on image data and control emission of the image light beam from the light source; a scanning unit configured to two-dimensionally scan the image light beam emitted from the light source; and a light guide member that is formed of a glass material through which the plurality of image light beams emitted from the scanning unit at different times pass, has a plurality of reflection surfaces that reflect the plurality of image light beams, converges the plurality of image light beams reflected by a last reflection surface, which reflects the plurality of image light beams last among the plurality of reflection surfaces, at a convergence point in an eye of a user, and then irradiates a retina of the user with the converged image light beams, wherein some image light beams of the plurality of image light beams pass through the last reflection surface, then enter again an opposite side of the last reflection surface and pass through the last reflection surface, are reflected by the last reflection surface, and are applied to the retina of the user, and remaining image light beams of the plurality of image light beams are reflected by the last reflection surface without passing through the last reflection surface, and are applied to the retina of the user, and wherein the last reflection surface has a reflectance of 15% or less.

In the above configuration, a configuration in which the plurality of reflection surfaces have a first reflection surface located closer to the eye of the user, a second reflection surface that is located farther from the eye of the user and on which the plurality of image light beams are incident before entering the last reflection surface, and a third reflection surface on which the plurality of image light beams are incident after passing through the last reflection surface, and a reflectance of the second reflection surface and a reflectance of the third reflection surface are substantially equal to each other may be employed.

In the above configuration, a configuration in which the reflectance of the second reflection surface and the reflectance of the third reflection surface are 40% or greater and 70% or less may be employed.

In the above configuration, a configuration in which a reflectance of the first reflection surface is 45% or greater and 55% or less, the reflectance of the second reflection surface and the reflectance of the third reflection surface are 50% or greater and 70% or less, and the reflectance of the last reflection surface is 5% or greater and 15% or less may be employed.

In the above configuration, a configuration in which the plurality of image light beams are reflected by the plurality of reflection surfaces the same number of times and are applied to the retina of the user may be employed.

Effects of the Invention

The present invention enables to secure sufficient clearance from the face of a user.

MODES FOR CARRYING OUT THE INVENTION

First, comparative examples of an optical system used in an image projection device will be described.

Comparative Example 1

Figure 1A:
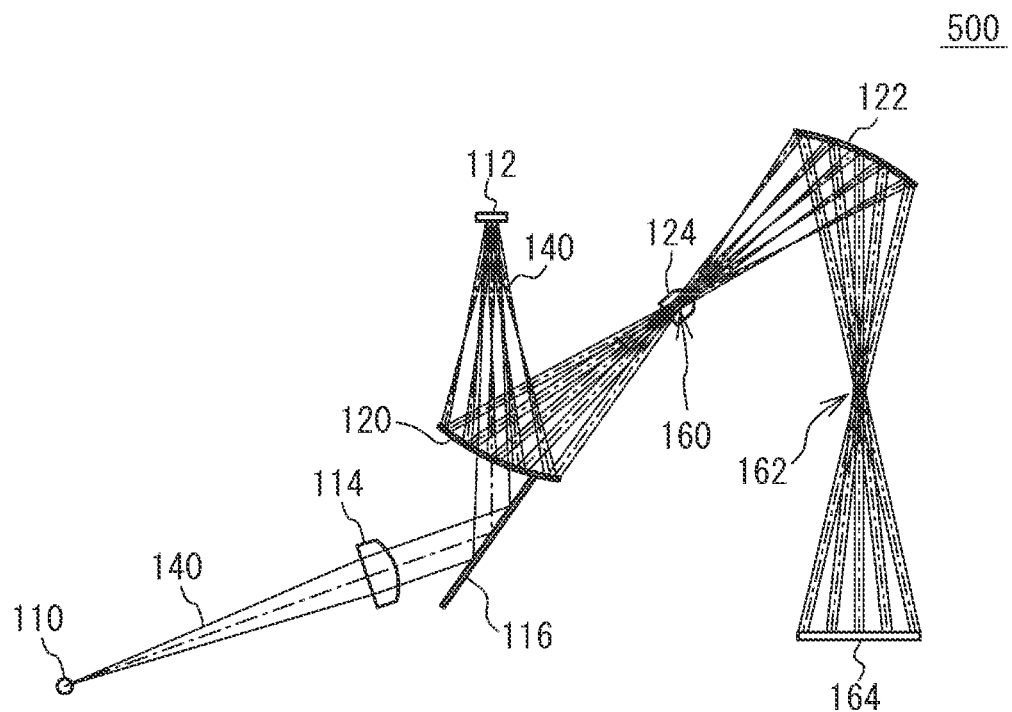
FIG. 1A illustrates an optical system in accordance with a comparative example 1.

FIG. 1A illustrates an optical system 500 in accordance with a comparative example 1. As illustrated in FIG. 1A, the optical system 500 of the comparative example 1 includes a light source 110, a scanning unit 112, a lens 114, a reflection mirror 116, a reflection mirror 120, a projection mirror 122, and a lens 124. The light source 110 emits a laser beam 140. The lens 114 converts the laser beam 140 emitted by the light source 110 from diffusion light into convergent light. The reflection mirror 116 is a plane mirror and reflects the laser beam 140 that has passed through the lens 114 toward the scanning unit 112. The scanning unit 112 two-dimensionally scans the incident laser beam 140. A plurality of the laser beams 140 two-dimensionally scanned by the scanning unit 112 and emitted from the scanning unit 112 at different times enter the reflection mirror 120. The reflection mirror 120 is a concave mirror having a curved reflection surface.

Each of the plurality of the scanned laser beams 140 enters the reflection mirror 120 as diffusion light, and is converted from the diffusion light into substantially parallel light by the reflection mirror 120. The plurality of the laser beams 140 scanned and reflected by the reflection mirror 120 converge at a convergence point 160 before the projection mirror 122. The lens 124 is disposed at the convergence point 160. Each of the plurality of the laser beams 140 is converted from substantially parallel light into convergent light by the lens 124, is condensed before the projection mirror 122, then becomes diffusion light, and enters the projection mirror 122. The projection mirror 122 is a concave mirror having a curved reflection surface, has substantially the same shape as the reflection mirror 120, and has substantially the same radius of curvature as the reflection mirror 120.

Each of the plurality of the laser beams 140 is converted from diffusion light into substantially parallel light by the projection mirror 122. The plurality of the laser beams 140 reflected by the projection mirror 122 are converged at a convergence point 162 and then applied to the projection surface 164.

When the optical system 500 is used in an image projection device, the convergence point 162 is located in the eye of the user (for example, near the pupil), and the laser beam 140 is converted from substantially parallel light into convergent light by the crystalline lens and focuses at the vicinity of the retina.

The scanning angle of the laser beam 140 by the scanning unit 112 and the convergence angle at which the plurality of the laser beams 140 converge at the convergence point 162 are approximately the same. In the laser beam 140, the optical path length between the scanning unit 112 and the reflection mirror 120 is approximately equal to the optical path length between the projection mirror 122 and the convergence point 162, and the optical path length between the reflection mirror 120 and the convergence point 160 is approximately equal to the optical path length between the convergence point 160 and the projection mirror 122. Therefore, the scanning unit 112, the convergence point 160, and the convergence point 162 are in a conjugate relationship of substantially equal magnification.

Figure 1B:
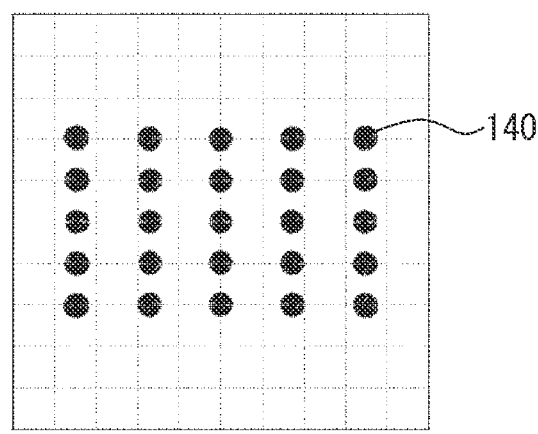
FIG. 1B presents a simulation result obtained by evaluating the laser beam with which a projection surface is irradiated in the optical system of FIG. 1A.

FIG. 1B presents a simulation result obtained by evaluating the laser beam 140 with which a projection surface 164 is irradiated in the optical system 500 of FIG. 1A. The simulation was performed for a case in which the plurality of the laser beams 140 emitted from the scanning unit 112 each had a substantially circular shape and were substantially uniformly distributed in a substantially rectangular shape as a whole (the same applies to the following similar simulations). As presented in FIG. 1B, since the scanning unit 112 and the convergence point 162 are in the conjugate relationship of substantially equal magnification, the plurality of the laser beams 140 on the projection surface 164 each had a substantially circular shape and were substantially uniformly distributed in a substantially rectangular shape as a whole.

Here, the reason why the lens 124 is disposed at the convergence point 160 will be described. The lens 124 converts the laser beam 140 from substantially parallel light to convergent light. The laser beam 140 converted into convergent light by the lens 124 is condensed before the projection mirror 122 and then becomes diffusion light to enter the projection mirror 122. The projection mirror 122 has a positive condensing power that causes the plurality of the laser beams 140 to converge at the convergence point 162. Therefore, by disposing the lens 124 whose focal length is set to an appropriate length at the convergence point 160 and setting the NA (numerical aperture) when the laser beam 140 enters the projection mirror 122 to an appropriate value, the laser beam 140 reflected by the projection mirror 122 can be made to be substantially parallel light.

Figure 2A:
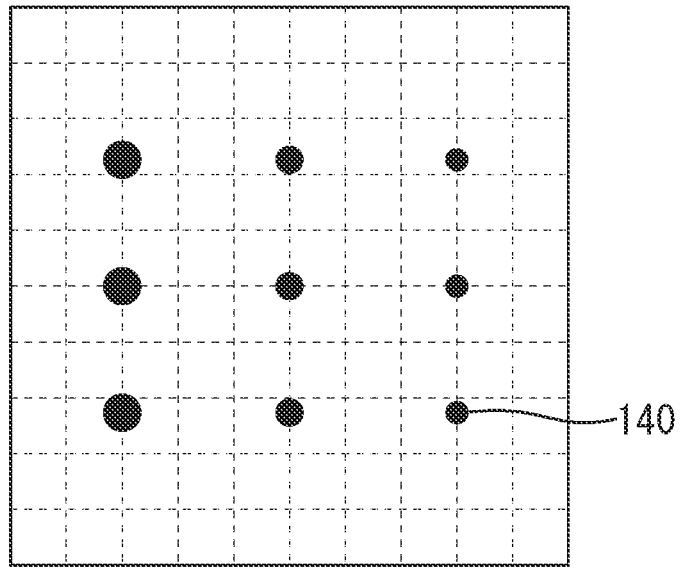
FIG. 2A and FIG. 2B present simulation results obtained by evaluating the laser beam with which the projection surface is irradiated when the focal length of the lens disposed at the convergence point is varied.
Figure 2B:
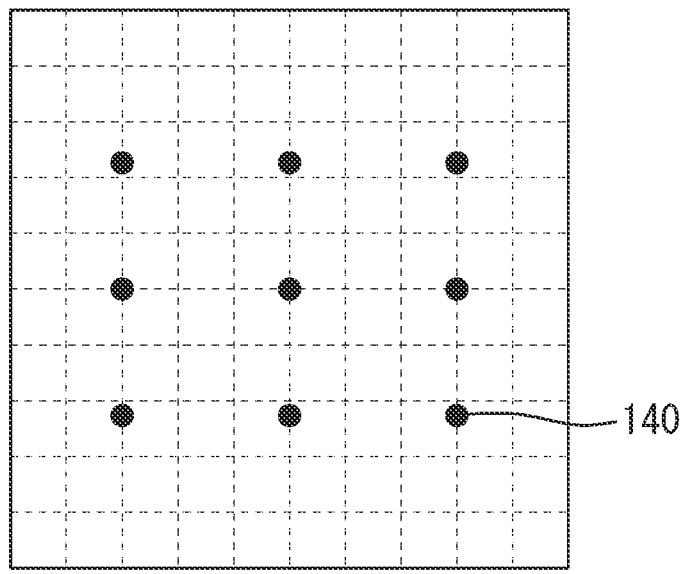

FIG. 2A and FIG. 2B present simulation results obtained by evaluating the laser beam 140 with which the projection surface 164 is irradiated when the focal length of the lens 124 disposed at the convergence point 160 is varied. FIG. 2A presents a simulation result in a case in which the focal length of the lens 124 was inappropriate, and FIG. 2B presents a simulation result in a case in which the focal length was appropriate. As presented in FIG. 2A, when the focal length of the lens 124 was inappropriate, the sizes of the plurality of the laser beams 140 on the projection surface 164 varied. This indicates that when the focal length of the lens 124 is inappropriate, the laser beam 140 that is not substantially parallel light is included in the plurality of the laser beams 140 reflected by the projection mirror 122. On the other hand, as illustrated in FIG. 2B, when the focal length of the lens 124 was appropriate, the sizes of the plurality of the laser beams 140 on the projection surface 164 were substantially uniform. This indicates that when the focal length of the lens 124 is appropriate, all of the plurality of the laser beams 140 reflected by the projection mirror 122 are substantially parallel lights.

As described above, the plurality of the laser beams 140 reflected by the projection mirror 122 can be made to be substantially parallel lights by disposing the lens 124 that converts the laser beam 140 from substantially parallel light to convergent light at the convergence point 160 and appropriately setting the focal length of the lens 124 to appropriately set the NA when the laser beam 140 enters the projection mirror 122. As a result, when the optical system 500 is used in an image projection device, the plurality of the laser beams 140 can be converted from substantially parallel lights to convergent lights by the crystalline lens and focused at the vicinity of the retina, and thereby, a high-quality image can be provided to the user. In addition, since the convergence point 160 is a point at which the plurality of the laser beams 140 converge, by disposing the lens 124 at the convergence point 160, it is possible to easily adjust the degree of convergence of the plurality of the laser beams 140 to be appropriate.

Comparative Example 2

Figure 3A:
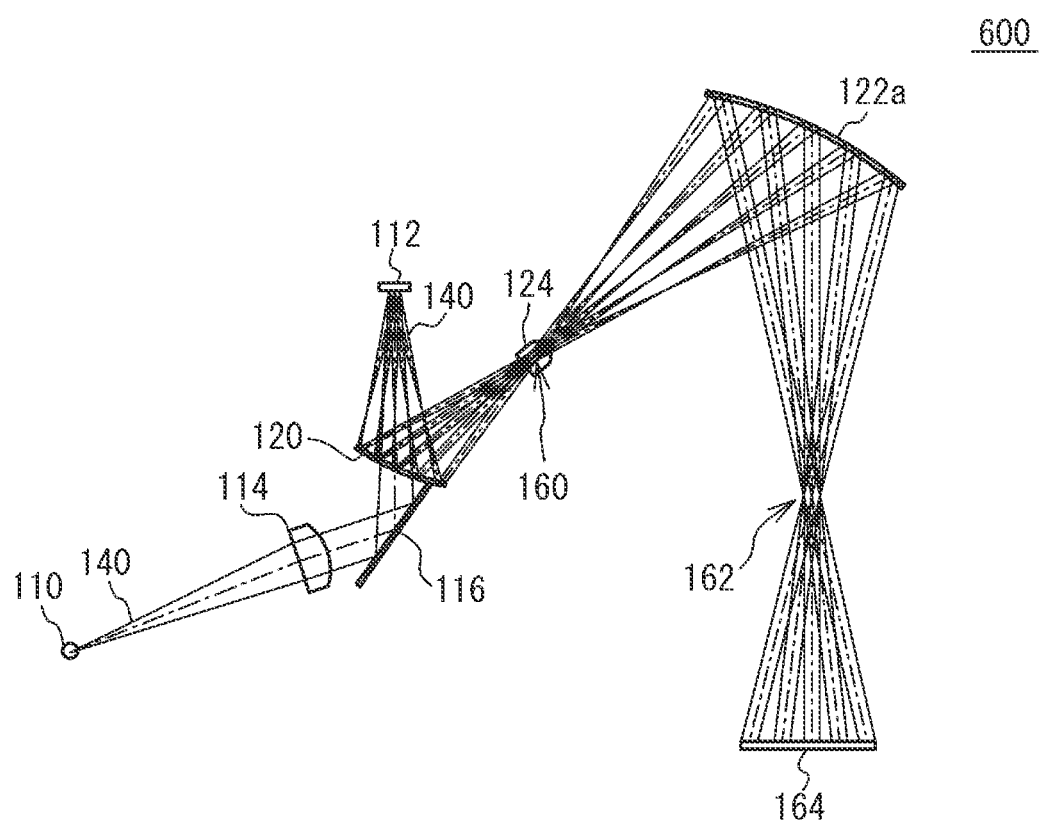
FIG. 3A illustrates an optical system in accordance with a comparative example 2.

Here, in order to secure the viewing angle of the image projected on the retina of the user, it is desirable to increase the size of the shape of the projection mirror disposed in front of the eye of the user. FIG. 3A illustrates an optical system 600 in accordance with a comparative example 2. As illustrated in FIG. 3A, the optical system 600 of the comparative example 2 includes a projection mirror 122a having a curvature radius larger than that of the reflection mirror 120 instead of the projection mirror 122. Therefore, the optical path length of the laser beam 140 between the scanning unit 112 and the reflection mirror 120 is different from the optical path length of the laser beam 140 between the projection mirror 122a and the convergence point 162. The optical path length of the laser beam 140 between the reflection mirror 120 and the convergence point 160 is different from the optical path length of the laser beam 140 between the convergence point 160 and the projection mirror 122a. On the other hand, the ratio of the optical path length of the laser beam 140 between the reflection mirror 120 and the convergence point 160 to the optical path length of the laser beam 140 between the scanning unit 112 and the reflection mirror 120 is substantially equal to the ratio of the optical path length of the laser beam 140 between the convergence point 160 and the projection mirror 122a to the optical path length of the laser beam 140 between the projection mirror 122a and the convergence point 162. Therefore, the optical system 600 has a layout in a similarity relationship of substantially equal magnification, and the scanning angle of the laser beam 140 by the scanning unit 112 and the convergence angle at which the plurality of the laser beams 140 converge at the convergence point 162 are substantially the same.

The similarity ratio of the optical system 600 may be determined by the distance between the projection mirror 122a and the eye of the user, the shape of the face of the user, and/or the space at the side of the face of the user.

Figure 3B:
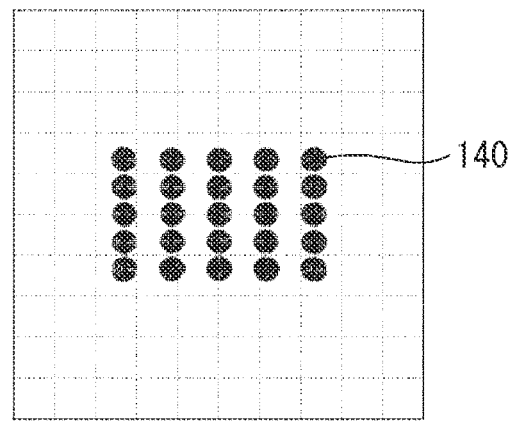
FIG. 3B presents a simulation result obtained by evaluating the laser beam with which the projection surface is irradiated in the optical system of FIG. 3A.

FIG. 3B presents a simulation result obtained by evaluating the laser beam 140 with which the projection surface 164 is irradiated in the optical system 600 of FIG. 3A. As presented in FIG. 3B, since the optical system 600 has a layout in a similarity relationship of substantially equal magnification, the plurality of the laser beams 140 on the projection surface 164 each had a substantially circular shape and were substantially uniformly distributed in a substantially rectangular shape as a whole.

Figure 4:
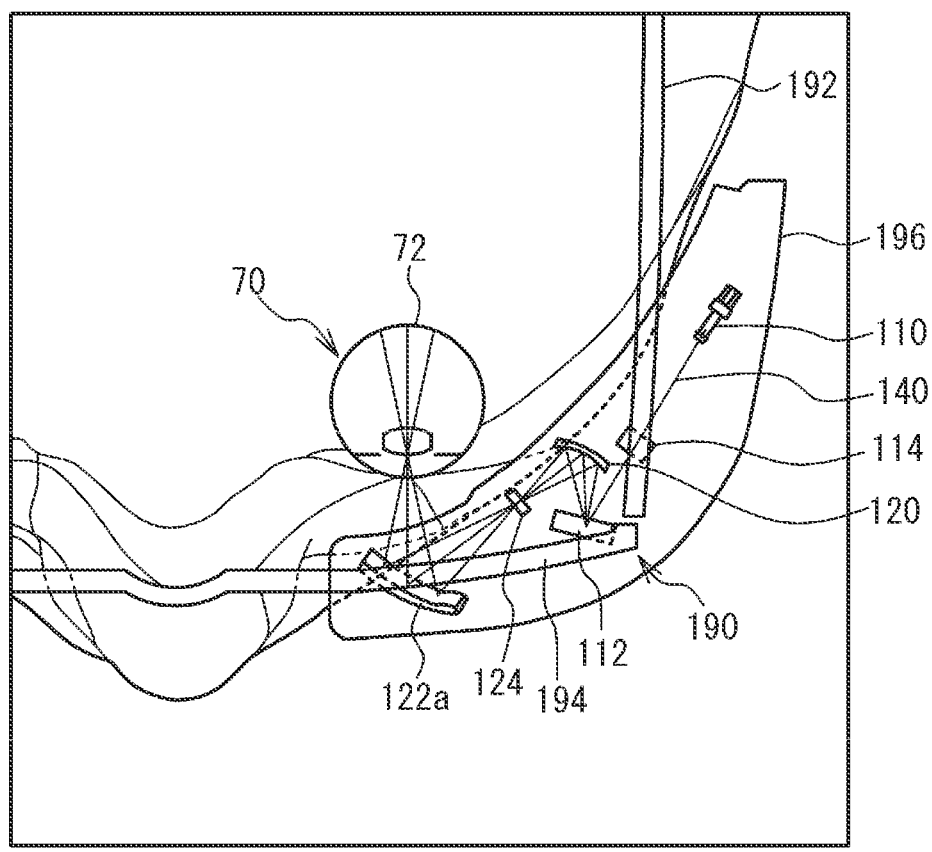
FIG. 4 illustrates a state in which the optical system in accordance with the comparative example 2 is attached to a spectacle-type frame.

When the optical system 600 in accordance with the comparative example 2 is used in an image projection device, the optical system 600 may be attached to a spectacle-type frame. FIG. 4 illustrates a state in which the optical system 600 in accordance with the comparative example 2 is attached to a spectacle-type frame 190. In FIG. 4, the path along which the laser beam 140 emitted from the light source 110 enters the scanning unit 112 is different from that in FIG. 3A. As illustrated in FIG. 4, since the projection mirror 122a is disposed in front of the eye of the user, the projection mirror 122a is disposed near a rim 194 of the spectacle-type frame 190. Therefore, the reflection mirror 120 and the lens 124 are disposed near the face of the user, and the laser beam 140 passes near the face of the user. In addition, the reflection mirror 120, the projection mirror 122a, the lens 124, and the like are accommodated in a housing 196 for protection thereof and protection of the laser beam 140, and the housing 196 is attached to a temple 192 and the rim 194 of the spectacle-type frame 190. Since the reflection mirror 120 and the lens 124 are disposed near the user's face, the clearance between the housing 196 and the user's face is reduced. For example, the distance between an eye 70 and the housing 196 may be reduced, and the housing 196 may interfere with the eyelashes, reducing the quality of the image projected on a retina 72. In addition, since the clearance between the housing 196 and the user's face is reduced, the housing 196 may interfere with the user's face depending on the shape of the user's face or the like. In addition, the dimension of the housing 196 in the front-rear direction cannot be within the clearance between the normal spectacle-type frame and the face, and a design in which the housing 196 protrudes forward is unavoidable.

Comparative Example 3

Figure 5A:
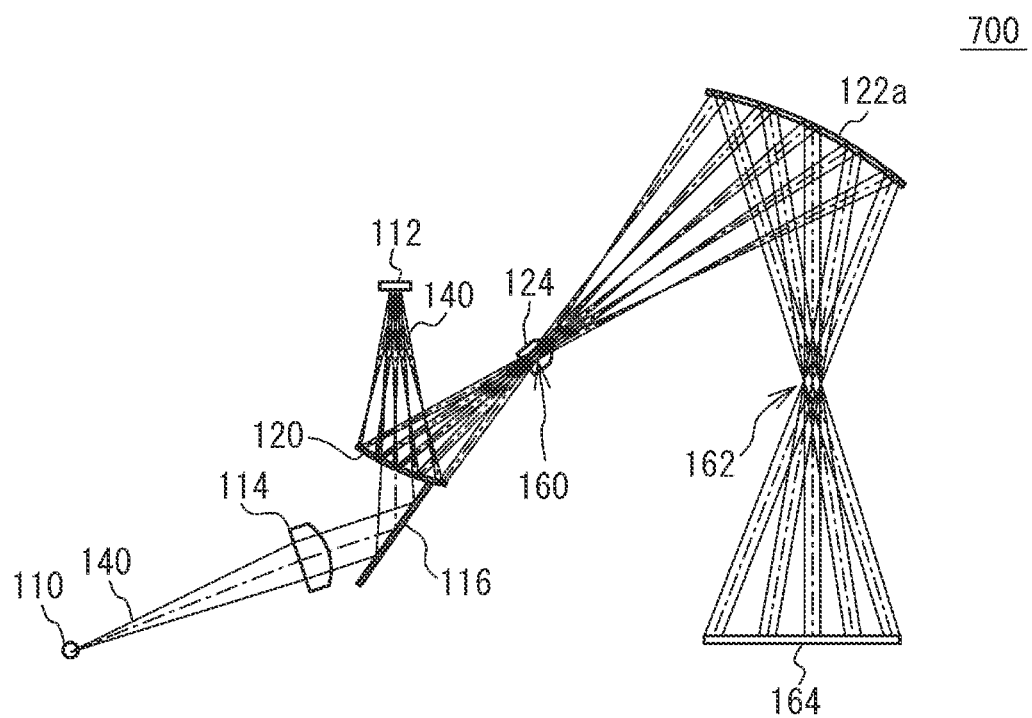
FIG. 5A illustrates an optical system in accordance with a comparative example 3.

Next, an optical system 700 in accordance with a comparative example 3 in which the viewing angle of an image is increased compared to the optical system 600 of the comparative example 2 will be described. FIG. 5A illustrates the optical system 700 in accordance with the comparative example 3. As illustrated in FIG. 5A, in the optical system 700 of the comparative example 3, the position of the convergence point 162 is closer to the projection mirror 122a than in the optical system 600 of the comparative example 3 in order to increase the viewing angle of the image.

In the optical system 700 of the comparative example 3, since the position of the convergence point 162 is closer to the projection mirror 122a than in the optical system 600 of the comparative example 2, as is clear from FIG. 4, the clearance between the housing 196 and the face of the user is further reduced. Therefore, deterioration in image quality due to interference of the housing 196 with the eyelashes and interference of the housing 196 with the user's face are more likely to occur.

Figure 5B:
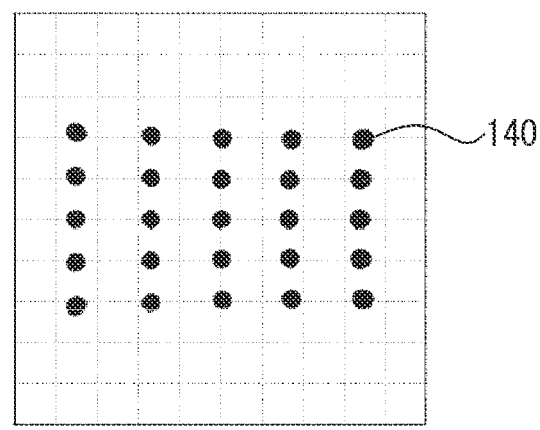
FIG. 5B presents a simulation result obtained by evaluating the laser beam with which the projection surface is irradiated in the optical system of FIG. 5A.

FIG. 5B presents a simulation result obtained by evaluating the laser beam 140 with which the projection surface 164 is irradiated in the optical system 700 of FIG. 5A. As presented in FIG. 5B, the overall shape of the plurality of the laser beams 140 on the projection surface 164 was substantially trapezoidal, resulting in generation of trapezoidal distortion. It is considered that the trapezoidal distortion occurred because the convergence point 162 was brought close to the projection mirror 122a and the layout was thus deviated from a layout in a similarity relationship of substantially equal magnification. That is, it is considered that the optical power received from the projection mirror 122a when the laser beam 140 obliquely entering the projection mirror 122a was reflected by the projection mirror 122a was not canceled by the optical power received from the reflection mirror 120 when the laser beam 140 was obliquely reflected by the reflection mirror 120, and trapezoidal distortion occurred.

In order to eliminate the trapezoidal distortion presented in FIG. 5B, there is a method in which the trapezoidal distortion is reduced by performing a process of generating an opposite trapezoidal distortion in the image itself to be projected in advance and canceling out the distortion generated in advance and the distortion generated by the optical system 700, but there is also a method in which the trapezoidal distortion is reduced by adjusting the incident angle of the laser beam 140 to the scanning unit 112.

Figure 6A:
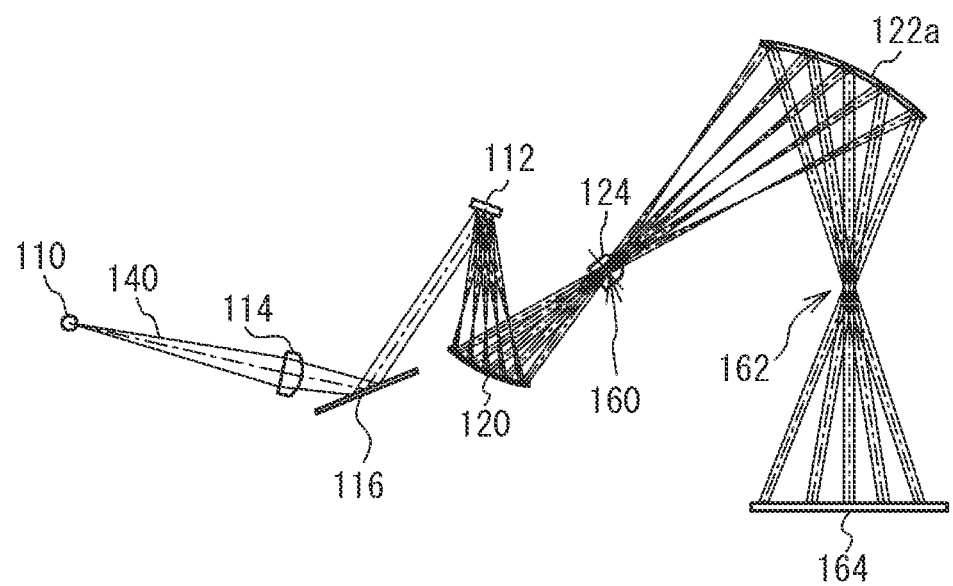
FIG. 6A is a view (part 1) illustrating an optical system in which the incident angle of the laser beam to the scanning unit is changed.
Figure 7A:
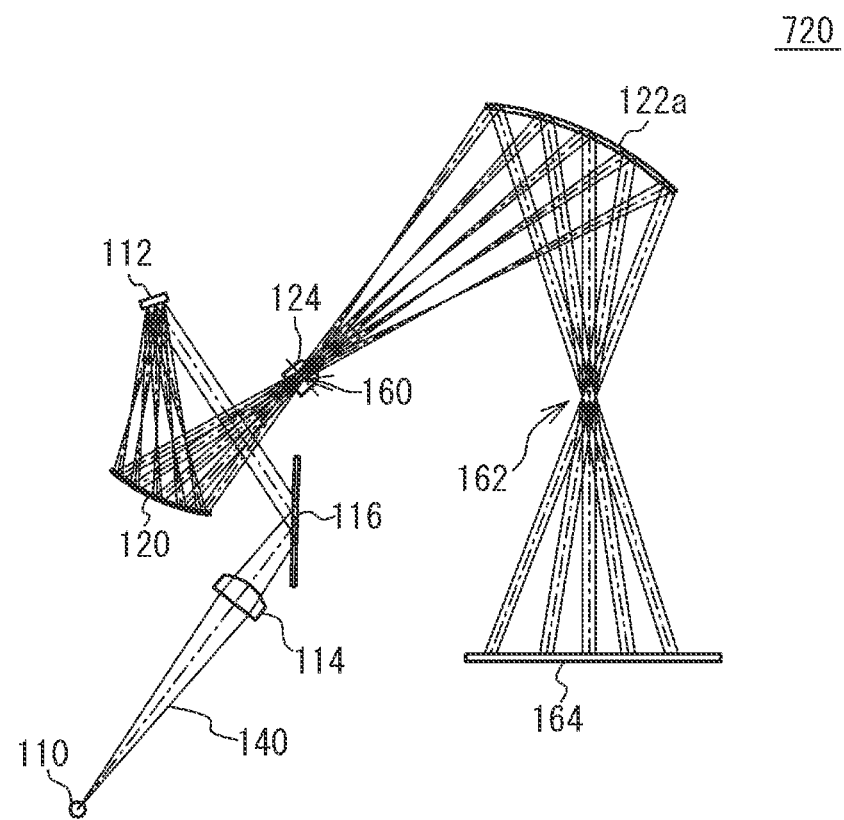
FIG. 7A is a view (part 2) illustrating an optical system in which the incident angle of the laser beam to the scanning unit is changed.

FIG. 6A and FIG. 7A illustrate optical systems 710 and 720 in which the incident angle of the laser beam 140 to the scanning unit 112 is changed, respectively. As illustrated in FIG. 6A, in the optical system 710, the laser beam 140 obliquely enters the scanning unit 112 from the side opposite to the projection mirror 122a with respect to the reflection mirror 120. As illustrated in FIG. 7A, in the optical system 720, the laser beam 140 obliquely enters the scanning unit 112 from the same side as the projection mirror 122a with respect to the reflection mirror 120.

Figure 6B:
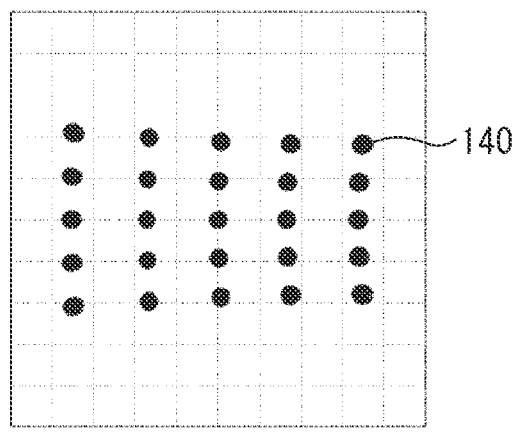
FIG. 6B presents a simulation result obtained by evaluating the laser beam with which the projection surface is irradiated in the optical system of FIG. 6A.
Figure 7B:
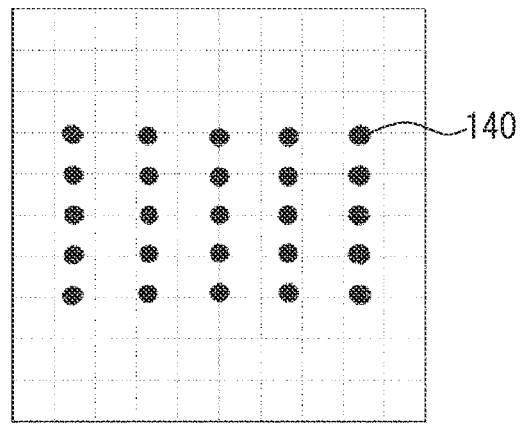
FIG. 7B is a simulation result obtained by evaluating the laser beam with which the projection surface is irradiated in the optical system of FIG. 7A.

FIG. 6B and FIG. 7B present simulation results obtained by evaluating the laser beam 140 with which the projection surface 164 is irradiated in the optical system 710 of FIG. 6A and the optical system 720 of FIG. 7A, respectively. As presented in FIG. 6B, in the optical system 710, the trapezoidal distortion was larger than that of the simulation result of the optical system 700 presented in FIG. 5B. The reason why the trapezoidal distortion increased in the optical system 710 is considered as follows. In the optical system 710, the direction in which the laser beam 140 travels toward the scanning unit 112 is substantially the same as the direction in which the laser beam 140 reflected by the reflection mirror 120 travels toward the projection mirror 122a. Therefore, it is considered that the trapezoidal distortion caused by the laser beam 140 entering the projection mirror 122a in an oblique direction was combined with the trapezoidal distortion caused by the laser beam 140 entering the scanning unit 112 in substantially the same oblique direction, and the trapezoidal distortion increased.

On the other hand, as illustrated in FIG. 7B, in the optical system 720, the trapezoidal distortion was less than that of the simulation result of the optical system 700 illustrated in FIG. 5B. The reason why the trapezoidal distortion was reduced in the optical system 720 is considered as follows. In the optical system 720, the direction in which the laser beam 140 travels toward the scanning unit 112 and the direction in which the laser beam 140 reflected by the reflection mirror 120 travels toward the projection mirror 122a are different directions (intersecting directions). Therefore, it is considered that the trapezoidal distortion caused by the laser beam 140 entering the projection mirror 122a in an oblique direction was weakened by the trapezoidal distortion caused by the laser beam 140 entering the scanning unit 112 in a different oblique direction, and the trapezoidal distortion was reduced.

As described above, the trapezoidal distortion can be reduced by causing the laser beam 140 to enter the scanning unit 112 in a direction different from the direction in which the laser beam 140 is reflected by the reflection mirror 120 and travels toward the projection mirror 122a.

As illustrated in FIG. 4, when the optical systems of the comparative examples 2 and 3 are used in the image projection device, it is difficult to ensure a sufficient clearance between the image projection device and the user's face. In addition, since the image projection device also protrudes in the forward direction, a dedicated frame is required, which impairs the design. Therefore, an example of an image projection device capable of securing a sufficient clearance between the image projection device and the user's face and reducing the amount of protrusion of the image projection device in the forward direction will be described below.

First Embodiment

Figure 8:
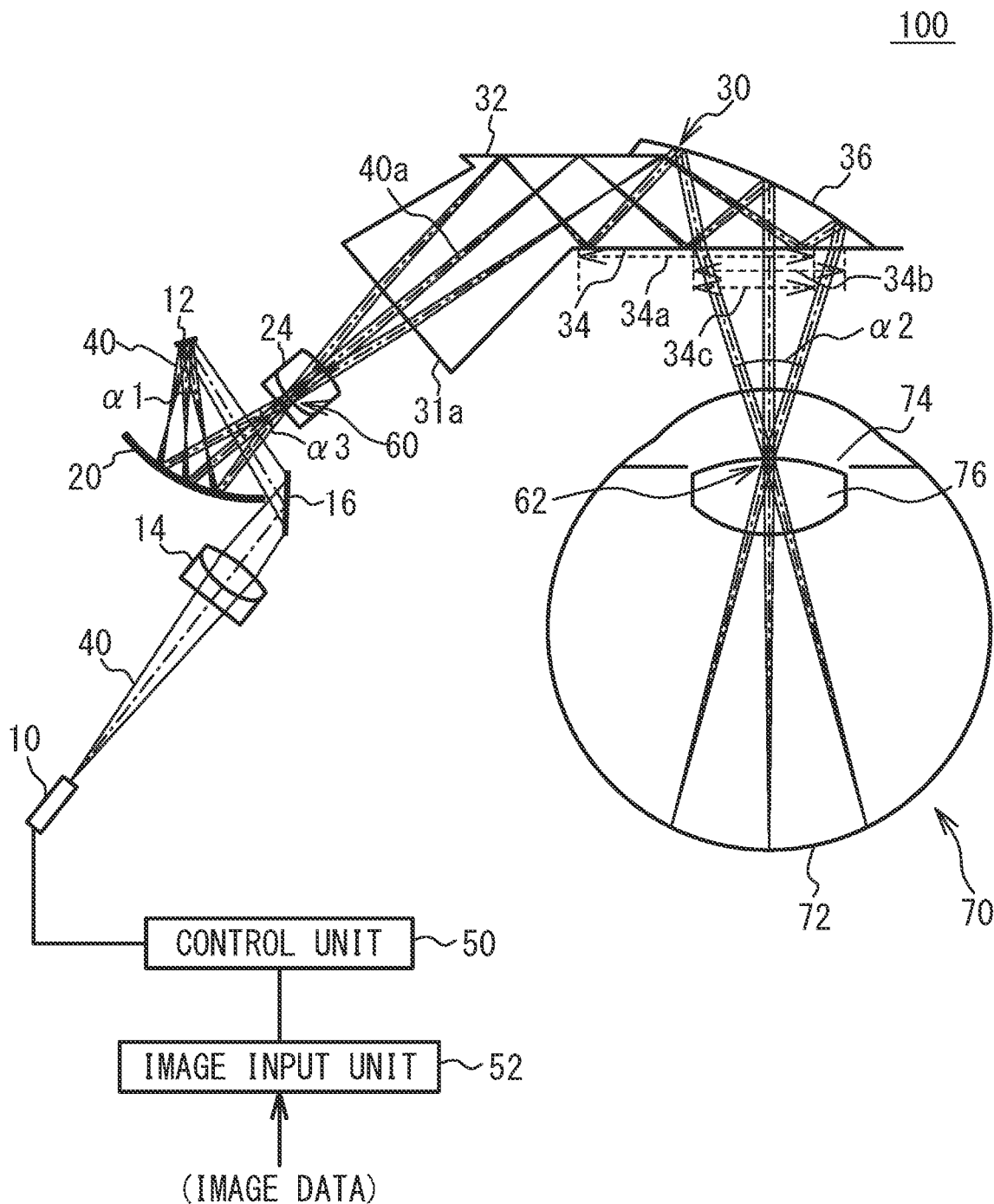
FIG. 8 illustrates an image projection device in accordance with a first embodiment.

FIG. 8 illustrates an image projection device 100 in accordance with the first embodiment. As illustrated in FIG. 8, the image projection device 100 includes a light source 10, a scanning unit 12, a lens 14, a reflection mirror 16, a reflection mirror 20, a lens 24, a light guide member 30, a control unit 50, and an image input unit 52. The image input unit 52 receives image data from a camera and/or a recording device (not illustrated). The control unit 50 controls emission of a laser beam 40 from the light source 10 on the basis of the input image data. Therefore, the image data is converted by the light source 10 into the laser beam 40, which is an image light beam. The control unit 50 also controls driving of the scanning unit 12.

Under the control by the control unit 50, the light source 10 emits a visible laser beam of, for example, a red laser light (wavelength: about 610 nm to 660 nm), a green laser light (wavelength: about 515 nm to 540 nm), and a blue laser light (wavelength: about 440 nm to 480 nm). Examples of the light source 10 that emits red, green, and blue laser lights include a light source in which red, green, and blue (RGB) laser diode chips and a three-color combining device are integrated. The light source 10 may emit a laser beam of a single wavelength.

The control unit 50 is, for example, a processor such as a central processing unit (CPU). If the camera is installed at an appropriate position so as to face the line-of-sight direction of the user, an image in the line-of-sight direction captured by the camera can be projected onto the retina 72. In addition, an image input from a recording device or the like can be projected, or a camera image and an image from the recording device or the like can be superimposed by the control unit 50 to project a so-called augmented reality (AR) image.

The laser beam 40 emitted by the light source 10 passes through the lens 14. The lens 14 is a condensing lens that converts the laser beam 40 from diffusion light to convergent light. The laser beam 40 that has passed through the lens 14 is reflected by the reflection mirror 16 toward the scanning unit 12, and enters the scanning unit 12 in a state of convergent light. The reflection mirror 16 is a plane mirror. The lens 14 is provided between the light source 10 and the scanning unit 12 in order to convert the laser beam 40 reflected by the reflection mirror 20 into substantially parallel light.

The scanning unit 12 (scanner) scans the incident laser beam 40 in two-dimensional directions including the horizontal direction and the vertical direction. The scanning unit 12 is, for example, a scanning mirror such as a micro electro mechanical system (MEMS) mirror. The scanning unit 12 may be of other types such as potassium tantalate niobate (KTN). A plurality of the laser beams 40 that are scanned in the two-dimensional directions by the scanning unit 12 and are emitted from the scanning unit 12 at different times enter the reflection mirror 20. Each of the plurality of the laser beams 40 is condensed before the reflection mirror 20 and then becomes diffusion light and enters the reflection mirror 20. The reflection mirror 20 is a concave mirror having a reflection surface formed of a curved surface such as a free curved surface, and has a positive condensing power. Therefore, each of the plurality of the laser beams 40 is converted from diffusion light into substantially parallel light by being reflected by the reflection mirror 20.

The plurality of the laser beams 40 reflected by the reflection mirror 20 converge at a convergence point 60 before the light guide member 30. The lens 24 is provided at the convergence point 60. The lens 24 is a condensing lens that converts each of the plurality of the laser beams 40 from substantially parallel light to convergent light. For the same reason as that described with reference to FIG. 2A and FIG. 2B, the lens 24 is provided at the convergence point 60 in order to make each of the plurality of the laser beams 40 emitted from the light guide member 30 toward the eye 70 of the user substantially parallel light. The plurality of the laser beams 40 that have passed through the lens 24 enter the light guide member 30.

The light guide member 30 is formed of a glass material such as a cycloolefin polymer (COP) resin or an acrylic resin. The laser beam 40 passes through the inside of the light guide member 30. The light guide member 30 has a plurality of reflection surfaces 32, 34, and 36. The reflection surfaces 32, 34, and 36 are formed by, for example, vapor-depositing a reflective material on a glass material. The laser beam 40 is reflected by the reflection surface 32, the reflection surface 34, and the reflection surface 36 in this order in the light guide member 30, and is then emitted from the light guide member 30 to the outside. The reflection surface 32 and the reflection surface 34 are substantially flat surfaces and are provided substantially parallel to each other. The reflection surface 32 and the reflection surface 34 are substantially parallel to the face of the user, for example. On the other hand, the reflection surface 36 is a concave curved surface such as a free curved surface. The substantially flat surface means a surface that is flat to such an extent that no condensing power is applied to the laser beam 40. The term "substantially parallel" means that the inclination is ±5° or less, may be ±3° or less, or may be ±1° or less.

Each of the plurality of the laser beams 40 incident on the light guide member 30 travels toward the reflection surface 32 while being converged. Each of the plurality of the laser beams 40 is condensed near the reflection surface 32. For example, a laser beam 40a corresponding to the center of the image projected onto the retina (which can also be referred to as a laser beam when the deflection angle of the scanning unit 12 is 0°) is condensed on the reflection surface 32. Each of the plurality of the laser beams 40 reflected by the reflection surface 32 travels toward the reflection surface 34. For example, all of the plurality of the laser beams 40 are condensed before the reflection surface 34 and then become diffusion lights and enter the reflection surface 34. Each of the plurality of the laser beams 40 reflected by the reflection surface 34 enters the reflection surface 36 in a state of diffusion light.

Since the reflection surface 36 is a concave curved surface, it has a positive condensing power. Therefore, each of the plurality of the laser beams 40 reflected by the reflection surface 36 is converted from diffusion light into substantially parallel light, and the plurality of the laser beams 40 converge at a convergence point 62 in the eye 70 of the user. The convergence point 62 is located, for example, near a pupil 74. Since the laser beam 40 traveling to the eye 70 is substantially parallel light, the laser beam 40 is converted from substantially parallel light into convergent light by a crystalline lens 76 and focuses at the vicinity of the retina 72. Thus, the user can visually recognize the image.

In order to increase the viewing angle of the image projected onto the retina 72, the curvature of the reflection surface 36 is set such that the convergence angle α2 at which the plurality of the laser beams 40 converge at the convergence point 62 is larger than the scanning angle α1 of the scanning unit 12.

The reflection surface 34 has a region 34a that reflects the laser beam 40 reflected by the reflection surface 32 toward the reflection surface 36 and a region 34b that allows the laser beam 40 reflected by the reflection surface 36 to pass therethrough, and the regions 34a and 34b partially overlap each other. In this overlapping region 34c, both a function of reflecting the laser beam 40 and a function of transmitting the laser beam 40 are required. The incident angle at which the laser beam 40 reflected by the reflection surface 32 enters the reflection surface 34 is larger than the incident angle at which the laser beam 40 reflected by the reflection surface 36 enters the reflection surface 34. Therefore, by providing at least the region 34c of the reflection surface 34 with the angle dependence such that the laser beam 40 having a large incident angle is mainly reflected and the laser beam 40 having a small incident angle is mainly transmitted, it is possible to both reflect the laser beam 40 reflected by the reflection surface 32 and transmit the laser beam 40 reflected by the reflection surface 36. Further, the laser beam 40 reflected by the reflection surface 36 is only required to be projected onto the retina 72, and even if the laser beam 40 reflected by the reflection surface 32 passes through the reflection surface 34, there is substantially no influence. Therefore, by using a half mirror for the reflection surface 34, it is possible to both reflect the laser beam 40 reflected by the reflection surface 32 and transmit the laser beam 40 reflected by the reflection surface 36.

Figure 9:
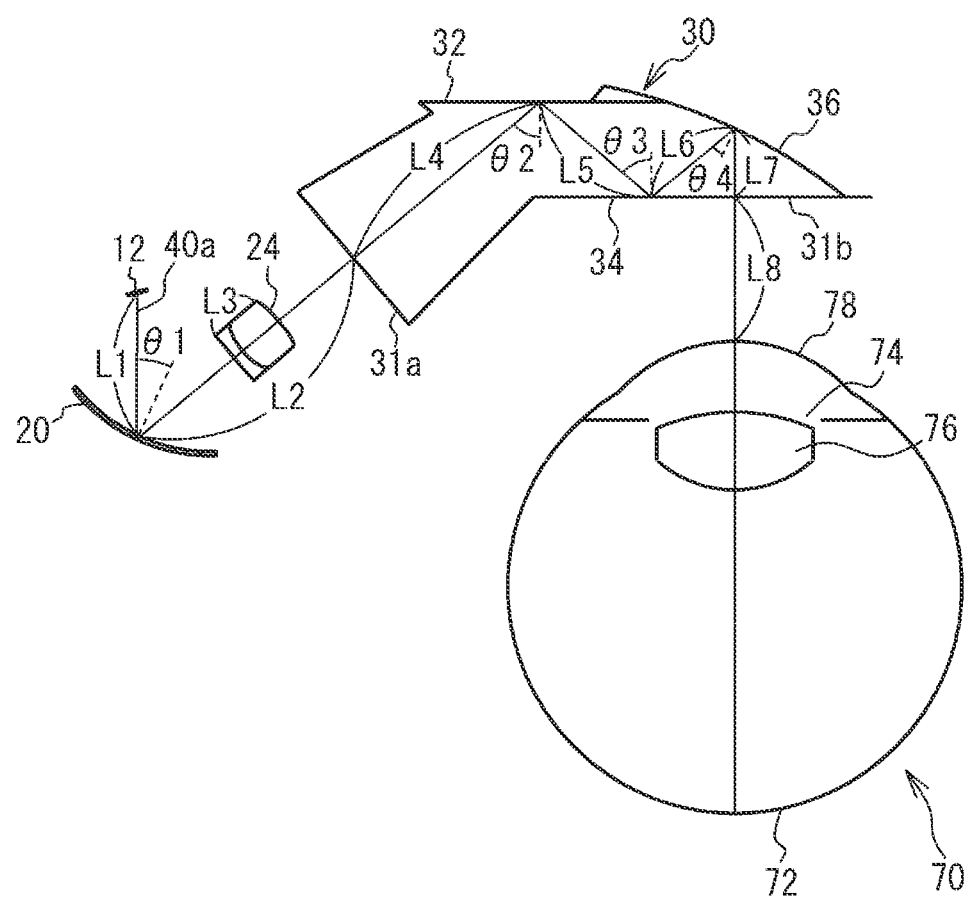
FIG. 9 illustrates an example of dimensions of the image projection device in accordance with the first embodiment.

Here, an example of dimensions of the image projection device 100 will be described. FIG. 9 illustrates an example of dimensions of the image projection device 100 in accordance with the first embodiment. Note that the following dimension examples are examples in which the refractive index of the light guide member 30 is assumed to be about 1.5 to 1.55. Each of the dimensions indicates the length in the trajectory of the axis of the laser beam 40a corresponding to the center of the image projected onto the retina 72. As illustrated in FIG. 9, the length L1 between the scanning unit 12 and the reflection mirror 20 is 6 mm to 9 mm, and is 7.5 mm as an example. The length L2 between the reflection mirror 20 and an incident surface 31a of the light guide member 30 is 10.7 mm to 16 mm, and is 13.4 mm as an example. The length L3 of the lens 24 is 2.4 mm to 3.6 mm, and is 3 mm as an example. The length L4 between the incident surface 31a of the light guide member 30 and the reflection surface 32 is 10 mm to 14.8 mm, and is 12.4 mm as an example. The length L5 between the reflection surfaces 32 and 34 is 6 mm to 9 mm, and is 7.6 mm as an example. The length L6 between the reflection surfaces 34 and 36 is 4.3 mm to 6.5 mm, and is 5.4 mm as an example. The length L7 between the reflection surface 36 and an emission surface 31b of the light guide member 30 is 2.8 mm to 4.2 mm, and is 3.5 mm as an example. The length L8 between the emission surface 31b of the light guide member 30 and a cornea 78 of the eye 70 is 6.7 mm to 10 mm, and is 8.4 mm as an example. The incident angle θ1 of the laser beam 40a to the reflection mirror 20 is 20° to 30°, and is 25O as an example. The incident angle θ2 of the laser beam 40a to the reflection surface 32 and the incident angle θ3 of the laser beam 40a to the reflection surface 34 are 40° to 60°, and are 50° as an example. The incident angle θ4 of the laser beam 40a to the reflection surface 36 is 20° to 30°, and is 25° as an example. The dimensions L2 to L7 in FIG. 9 have the same design result as long as the optical path length, that is, the total sum of the products of the refraction index and the distances is constant. The dimensions may be finely adjusted using this fact.

As described above, for example, the lengths L4, L5, L6, and L7 in the light guide member 30 are shorter in this order. For example, the incident angle θ1 of the laser beam 40a to the reflection mirror 20 and the incident angle θ4 of the laser beam 40a to the reflection surface 36 are substantially the same, the incident angle θ2 of the laser beam 40a to the reflection surface 32 and the incident angle θ3 of the laser beam 40a to the reflection surface 34 are substantially the same, and the incident angles θ2 and 03 are substantially twice the incident angles θ1 and 04. Thus, a high-quality image can be projected onto the retina 72. The term "the incident angles are substantially the same" means that the incident angles are substantially the same to such an extent that a high-quality image can be projected onto the retina 72, and the term "the incident angle is substantially twice another incident angle" means that the incident angle is substantially twice another incident angle to such an extent that a high-quality image can be projected onto the retina 72.

As illustrated in FIG. 8, the direction in which the laser beam 40a corresponding to the center of the image projected on the retina 72 is reflected by the scanning unit 12 and travels toward the reflection mirror 20 is substantially parallel to the direction in which the laser beam 40a is reflected by the reflection surface 36 of the light guide member 30 and travels toward the eye 70. The reflection surface 34 is provided so as to be substantially orthogonal to the laser beam 40a when the laser beam 40a is reflected by the reflection surface 36 of the light guide member 30 and travels toward the eye 70. The reflection surface 32 is provided substantially parallel to the reflection surface 34. With such a configuration, a high-quality image can be projected onto the retina 72. The term "substantially parallel" means a case in which the inclination is ±5° or less, may be a case in which the inclination is ±3° or less, or may be a case in which the inclination is ±° or less. The term "substantially orthogonal" means that the intersecting angle is 90°±5°, may be 90°±3°, or may be 90°±10.

Figure 10A:
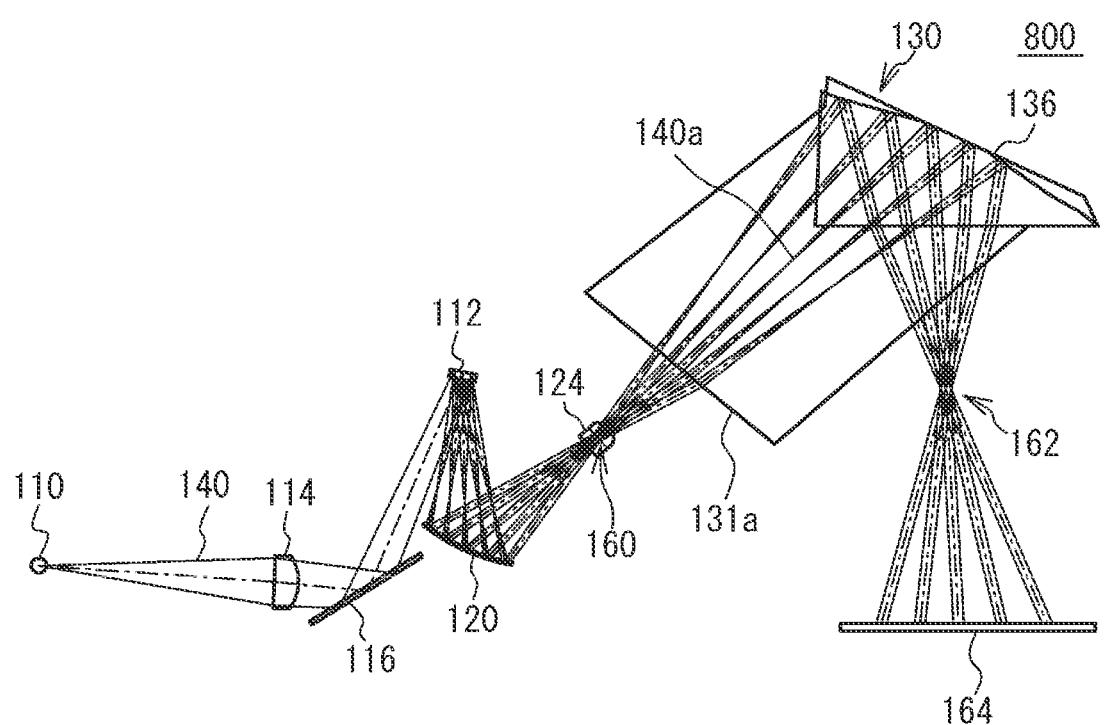
FIG. 10A is a view (part 1) illustrating an optical system subjected to simulation.

The laser beam 40a corresponding to the center of the image projected onto the retina 72 substantially perpendicularly enters the incident surface 31a of the light guide member 30. The term "substantially perpendicular" refers to 90°±5°, and may be 90°±3°, or may be 90°±10. The effect of this configuration will be described with reference to FIG. 10A to FIG. 11B. FIG. 10A and FIG. 11A illustrate optical systems 800 and 810 for which simulations were performed, respectively, and FIG. 10B and FIG. JI B present simulation results obtained by evaluating the laser beam 140 with which the projection surface 164 is irradiated in the optical system 800 of FIG. 10A and the optical system 810 of FIG. 11A, respectively.

As illustrated in FIG. 10A and FIG. 11A, in the optical systems 800 and 810 used in the simulation, a plurality of the laser beams 140 are reflected by the reflection mirror 120, are converged at the convergence point 160, and then enter a light guide member 130 from an incident surface 131a. The light guide member 130 has a reflection surface 136, and the plurality of the laser beams 140 are reflected by the reflection surface 136, converged at the convergence point 162, and then projected onto the projection surface 164. In the optical system 800 of FIG. 10A, the incident surface 131a of the light guide member 130 is inclined to one side with respect to the laser beam 140a when the deflection angle of the scanning unit 112 is 0°. In the optical system 810 of FIG. 11A, the incident surface 131a of the light guide member 130 is inclined to the other side with respect to the laser beam 140a when the deflection angle of the scanning unit 112 is 0°.

Figure 10B:
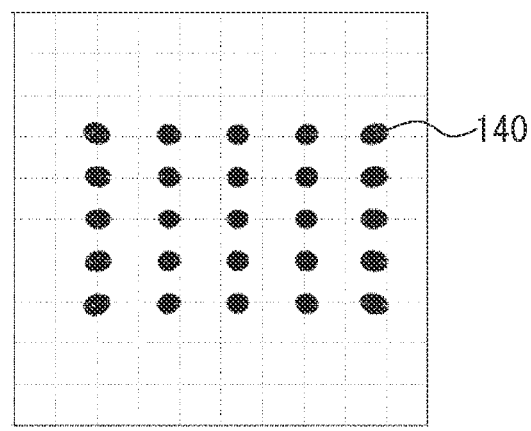
FIG. 10B presents a simulation result obtained by evaluating the laser beam with which the projection surface is irradiated in the optical system of FIG. 10A.
Figure 11A:
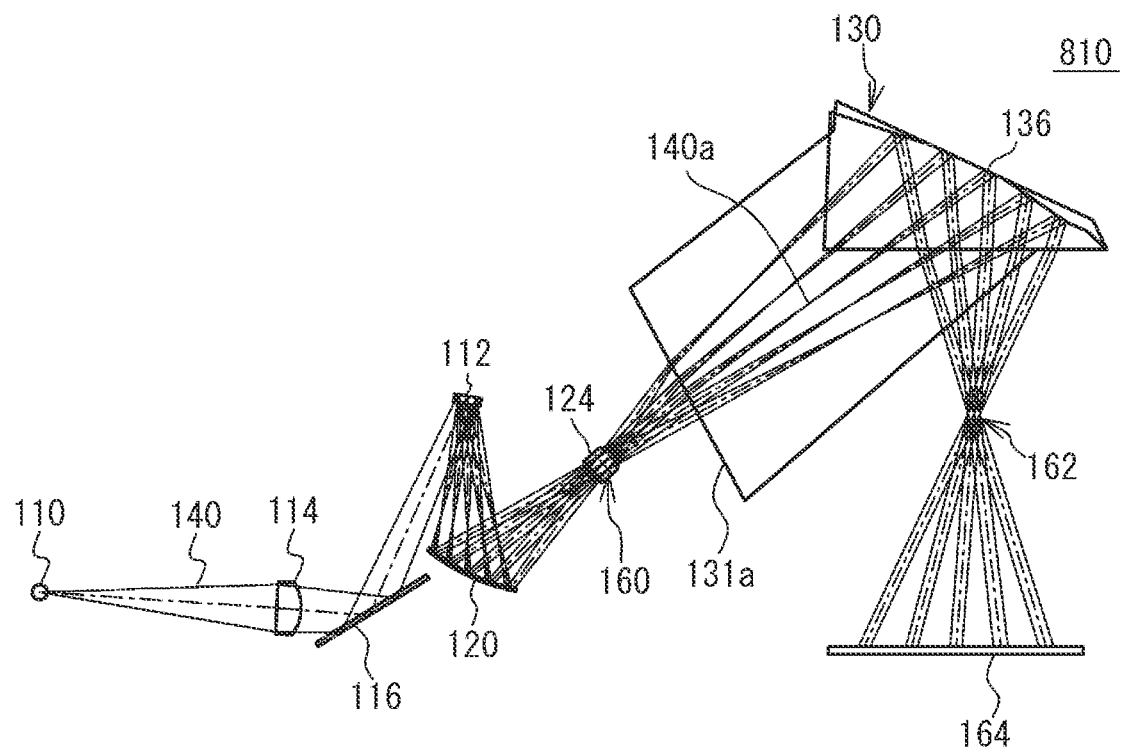
FIG. 11A is a view (part 2) illustrating an optical system subjected to simulation.
Figure 11B:
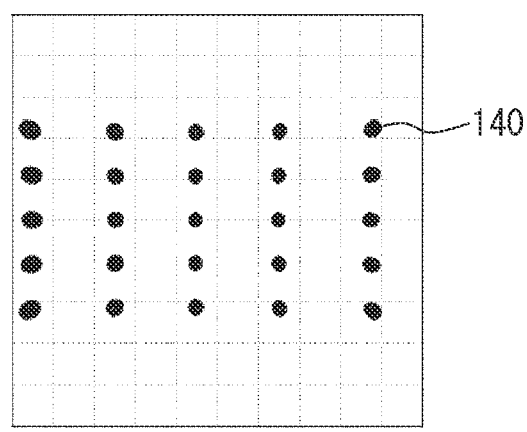
FIG. 11B presents a simulation result obtained by evaluating the laser beam with which the projection surface is irradiated in the optical system of FIG. 11A.

As presented in FIG. 10B and FIG. 11B, when the laser beam 140a entered the light guide member 130 at an angle, a deflection and a deflection angle occurred in the plurality of the laser beams 140 with which the projection surface 164 was irradiated.

The simulation results reveal that the laser beam 40a preferably enters the incident surface 31a of the light guide member 30 substantially perpendicularly in order to project a high-quality image on the retina 72 in the image projection device 100 of the first embodiment.

Figure 12:
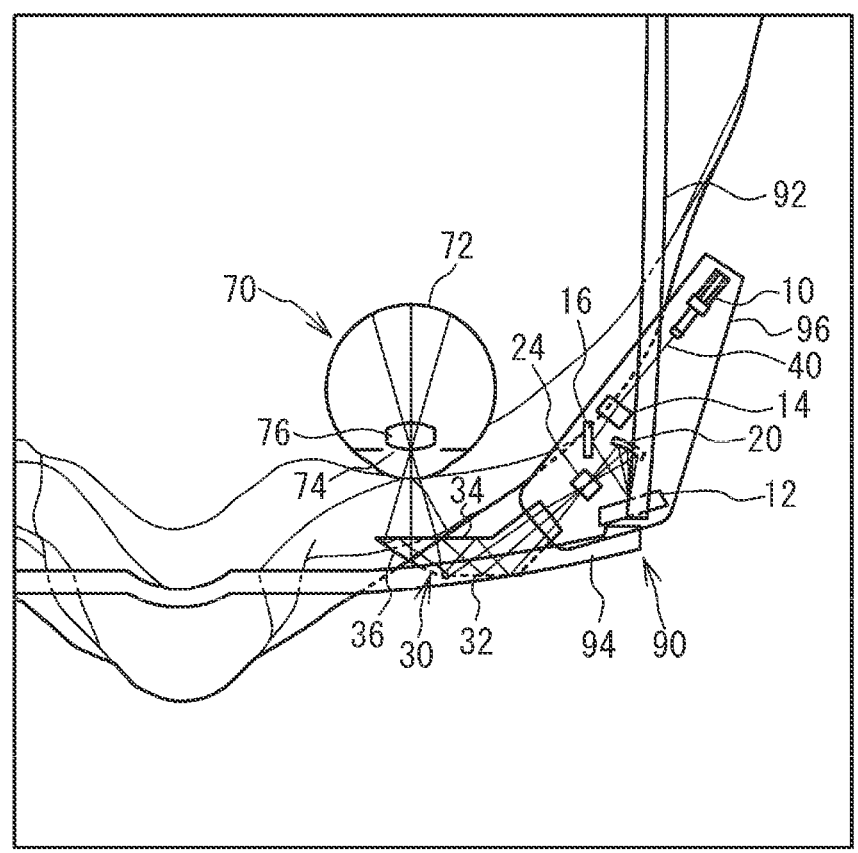
FIG. 12 illustrates a state in which the image projection device in accordance with the first embodiment is attached to a spectacle frame.

FIG. 12 illustrates a state in which the image projection device 100 in accordance with the first embodiment is attached to a spectacle-type frame 90. As illustrated in FIG. 12, the spectacle-type frame 90 has a temple 92 and a rim 94. The scanning unit 12 and the reflection mirror 20 are attached to the spectacle-type frame 90 near the temple 92. The light guide member 30 is attached to the spectacle-type frame 90 near the rim 94. The light source 10, the scanning unit 12, the lens 14, the reflection mirror 16, the reflection mirror 20, and the lens 24 are housed in a housing 96 for protecting them and the laser beam 40. When the housing 96 is attached to the spectacle-type frame 90, the optical components in the housing 96 are attached to the spectacle-type frame. Since the light guide member 30 is formed of a glass material and the laser beam 40 passes through the inside of the light guide member 30, most of the light guide member 30 is not located in the housing 96. The term "most of the light guide member 30 is not located in the housing 96" means that 80% or more of the light guide member 30 is not located in the housing 96, 85% or greater of the light guide member 30 may be not located in the housing 96, or 90% or greater of the light guide member 30 may be not located in the housing 96.

Since the laser beam 40 travels inside the light guide member 30 while being reflected by the reflection surfaces 32 to 36, the reflection mirror 20 and the lens 24 can be disposed at positions away from the face of the user. In addition, since the reflection mirror 20, the lens 24, and the like are disposed at positions away from the face of the user, the housing 96 that houses the reflection mirror 20, the lens 24, and the like therein is provided away from the face of the user. Therefore, a sufficient clearance can be secured between the housing 96 and the user's face, and the housing 96 can be prevented from interfering with the user's face.

Since the light guide member 30 is formed of a glass material, most of the light guide member 30 is not required to be housed in the housing 96. When the viewing angle of the image projected onto the retina 72 is increased, the distance between the eye 70 and the light guide member 30 (the length L8 in FIG. 9) decreases. However, since most of the light guide member 30 is not housed in the housing 96, the distance between the eye 70 and the light guide member 30 can be maintained at a length (for example, 8 mm or greater) with which the eyelashes are less likely to interfere with the light guide member 30 even when the viewing angle of the image is increased.

In addition, since the light guide member 30 formed of a glass material is disposed in front of the eye and the laser beam 40 is reflected multiple times inside the light guide member 30 and then applied to the retina 72, the light guide member 30 has a shape extending along the face of the user. Therefore, compared to the case in which the laser beam is reflected by the projection mirror disposed in front of the eye and applied to the retina 72 as in the comparative example 2, the protrusion of the image projection device 100 in the forward direction in front of the eye is reduced. Furthermore, since the laser beam 40 travels inside the light guide member 30, the light guide member 30 does not need to be covered with the housing 96. In this respect, the protrusion of the image projection device 100 in the forward direction in front of the eye is reduced. Thus, the design can be improved.

As described above, in the first embodiment, as illustrated in FIG. 8, the plurality of the laser beams 40 (image light beams) scanned by the scanning unit 12 enter the light guide member 30 after being converged at the convergence point 60 (a second convergence point) before the light guide member 30 by the reflection mirror 20 (a first optical member). The light guide member 30 is formed of a glass material through which the laser beam 40 passes, and converges the plurality of the laser beams 40 reflected by a plurality of the reflection surfaces 32, 34, and 36 at the convergence point 62 (the first convergence point) in the eye 70 and then irradiates the retina 72 with the converged laser beams 40. At the convergence point 60, the lens 24 (a second optical member) is provided which causes the laser beam 40 to enter the last reflection surface 36 of the light guide member 30 as diffusion light. By providing the lens 24 at the convergence point 60, the NA when the laser beam 40 enters the last reflection surface 36 of the light guide member 30 can be set to an appropriate value, and the plurality of the laser beams 40 reflected by the reflection surface 36 can be made to be substantially parallel light. Therefore, a high-quality image can be projected. By providing, behind the lens 24, the light guide member 30 formed of a glass material through which the laser light 40 passes as illustrated in FIG. 12, most of the light guide member 30 does not need to be housed in the housing 96, and thus it is possible to secure a sufficient clearance between the image projection device 100 and the face of the user.

In addition, in the first embodiment, as illustrated in FIG. 12, the scanning unit 12 and the reflection mirror 20 are attached near the temple 92 of the spectacle-type frame 90, and the light guide member 30 is attached near the rim 94 of the spectacle-type frame 90. The light guide member 30 has a shape extending from the front of the eye 70 of the user toward the temple 92 of the spectacle-type frame 90. Therefore, the scanning unit 12, the reflection mirror 20, the lens 24, and the light guide member 30 can be disposed along the contour of the face of the user. Therefore, a sufficient clearance can be secured between the image projection device 100 and the user's face. In addition, the image projection device 100 can be miniaturized.

In addition, in the first embodiment, as illustrated in FIG. 12, the light guide member 30 has an odd number of the reflection surfaces 32, 34, and 36, and a plurality of the laser beams 40 that are reflected by the reflection mirror 20 and travel obliquely forward enter the light guide member 30. Therefore, the laser beam 40 travels inside the light guide member 30 from the temple 92 side of the spectacle-type frame 90 toward the eye 70, and the scanning unit 12, the reflection mirror 20, the lens 24, and the light guide member 30 can be disposed along the contour of the user's face.

In addition, in the first embodiment, as illustrated in FIG. 8, the last reflection surface 36 of the plurality of the reflection surfaces 32, 34, and 36 of the light guide member 30 is a concave curved surface, and the remaining reflection surfaces 32 and 34 are substantially flat surfaces. Therefore, the laser beam 40 can be caused to travel inside the light guide member 30 from the temple 92 side of the spectacle-type frame 90 toward the eye 70, and the scanning unit 12, the reflection mirror 20, the lens 24, and the light guide member 30 can be disposed along the contour of the user's face. The reflection surfaces 32 and 34 are preferably substantially parallel to each other.

In the first embodiment, as illustrated in FIG. 8, the reflection surface 34 (a first reflection surface) immediately before the last reflection surface 36 has the region 34c on which both the laser beam 40 reflected by the reflection surface 32 (a second reflection surface) immediately before the reflection surface 34 and the laser beam 40 reflected by the last reflection surface 36 are incident. The reflection surface 34 reflects the laser beam 40 reflected by the reflection surface 32 to the reflection surface 36 and transmits the laser beam 40 reflected by the reflection surface 36 in the region 34c thereof. As a result, the plurality of the laser beams 40 can be converged at the convergence point 62 to irradiate the retina 72 with the converged laser beams 40. In addition, the light guide member 30 can be miniaturized.

In addition, in the first embodiment, the reflection surface 34 is substantially orthogonal to the optical axis after the laser beam 40a (central image light beam) corresponding to the center of the image is reflected by the reflection surface 36. Thus, even when the plurality of the laser beams 40 reflected by the reflection surface 36 are refracted when emitted from the light guide member 30, the plurality of the laser beams 40 can be converged at the convergence point 62.

In addition, in the first embodiment, the convergence angle α2 at which the plurality of the laser beams 40 converge at the convergence point 62 is larger than the scanning angle α1 at which the scanning unit 12 scans the plurality of the laser beams 40. Thus, the viewing angle of the image projected on the retina 72 can be increased. In addition, since most of the light guide member 30 does not need to be housed in the housing 96, it is possible to secure a sufficient clearance between the image projection device 100 and the face of the user even when the convergence point 62 is brought close to the light guide member 30 in order to increase the viewing angle of the image. The convergence angle α2 may be equal to or greater than the scanning angle α1.

In addition, in the first embodiment, as illustrated in FIG. 12, the laser beam 40 travels obliquely forward from the side closer to the user's face than the scanning unit 12 attached near the temple 92 of the spectacle-type frame 90, enters the scanning unit 12, travels backward from the scanning unit 12, is then reflected obliquely forward by the reflection mirror 20, and enters the light guide member 30 attached near the rim 94 of the spectacle-type frame 90. Thus, for the same reason as described with reference to FIG. 7A and FIG. 7B, it is possible to project a high-quality image with reduced distortion onto the retina 72.

Second Embodiment

Figure 13:
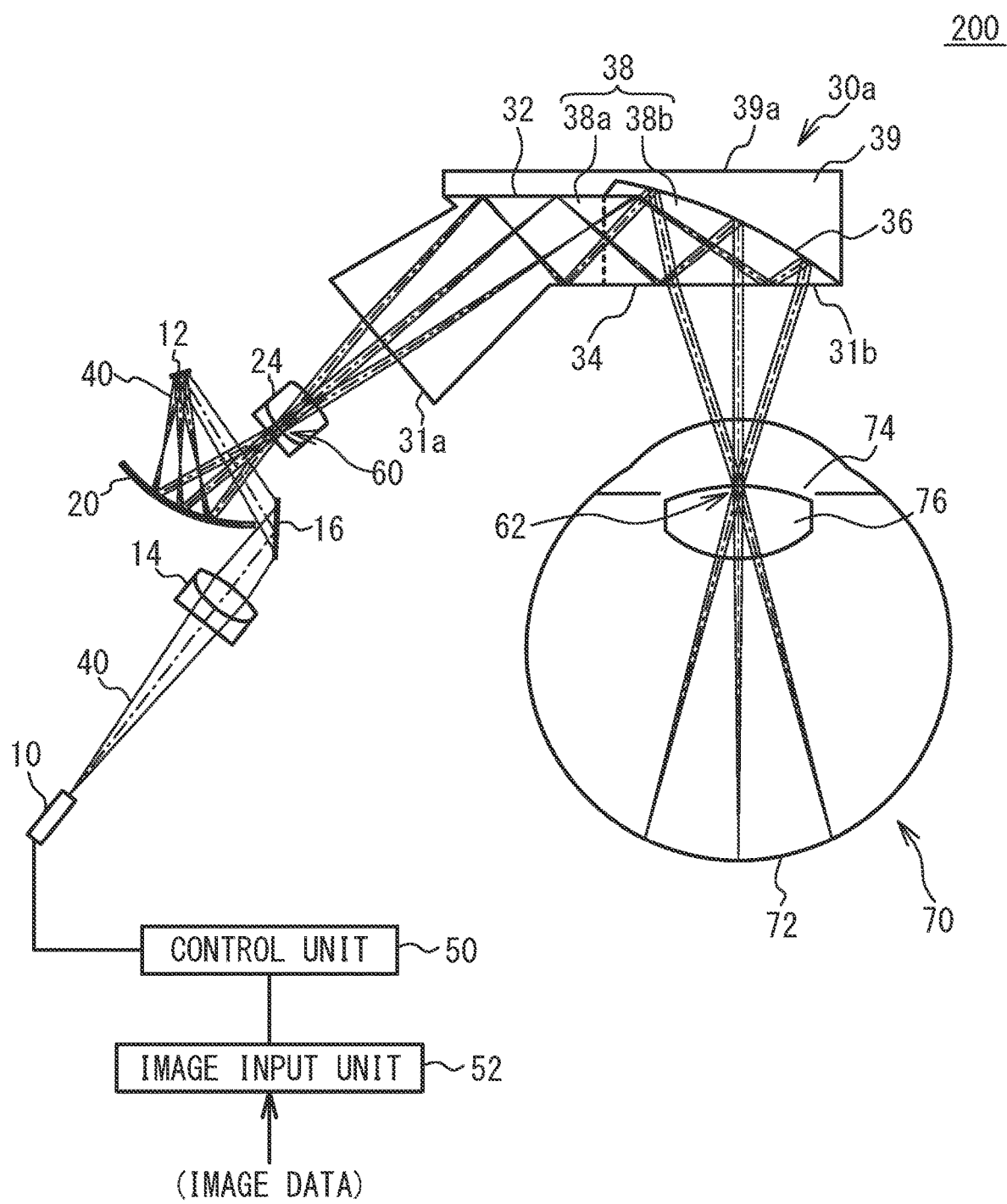
FIG. 13 illustrates an image projection device in accordance with a second embodiment.

FIG. 13 illustrates an image projection device 200 in accordance with a second embodiment. In the image projection device 200 of the second embodiment, as illustrated in FIG. 13, a light guide member 30a includes a main body portion 38 in which the plurality of the laser beams 40 incident on the incident surface 31a travel while being reflected by the reflection surfaces 32 to 36 in order to be applied to the eye 70 of the user, and a cover portion 39 attached to the main body portion 38 so as to cover the reflection surfaces 32 and 36 from the outside. The main body portion 38 and the cover portion 39 are formed of glass materials having substantially the same refractive index, and are formed of, for example, the same glass material. The emission surface 31b through which the plurality of the laser beams 40 reflected by the reflection surface 36 are emitted from the main body portion 38 is flatter than the reflection surface 36. An opposite surface 39a of the cover portion 39 from the emission surface 31b of the main body portion 38 with respect to the reflection surface 36 is flatter than the reflection surface 36. The opposite surface 39a of the cover portion 39 and the emission surface 31b of the main body portion 38 are, for example, substantially parallel to each other and substantially flat surfaces. In addition, all of the reflection surfaces 32 to 36 are half mirrors. Other configurations are the same as those of the first embodiment, and thus description thereof will be omitted.

Figure 14:
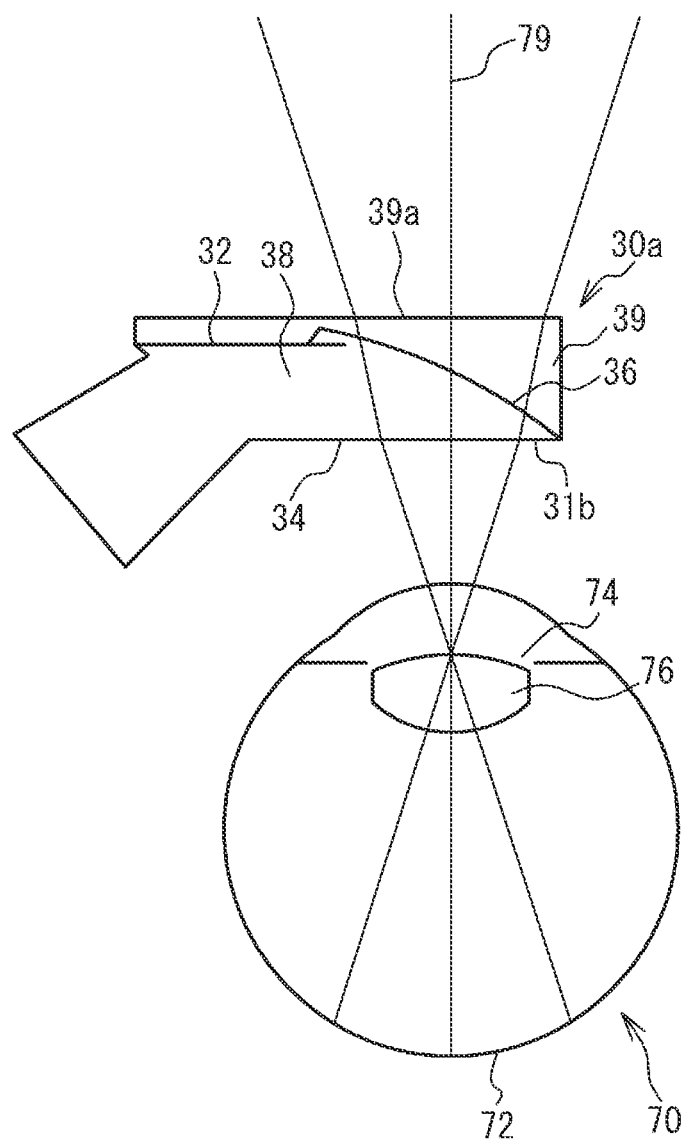
FIG. 14 illustrates a case in which the user views the outside world through a light guide member in the second embodiment.

FIG. 14 illustrates a case in which the user views the outside world through the light guide member 30a in the second embodiment. As illustrated in FIG. 14, the emission surface 31b of the main body portion 38, the reflection surface 36, and the surface 39a of the cover portion 39 are located in front of the eye 70 of the user. Since the refractive indexes of the main body portion 38 and the cover portion 39 are substantially the same and the surface 39a of the cover portion 39 and the emission surface 31b of the main body portion 38 are surfaces having high flatness, the user can visually recognize the outside world through the reflection surface 36 that is a half mirror as indicated by a line of sight 79 with less discomfort.

In the second embodiment, the light guide member 30a includes the main body portion 38 through which the plurality of the laser beams 40 that are repeatedly reflected by the plurality of the reflection surfaces 32 to 36 and applied to the retina 72 of the user pass, and the cover portion 39 that covers the last reflection surface 36 and has substantially the same refraction index as the main body portion 38. The reflection surface 36 is a half mirror, and the surface 39a of the cover portion 39 and the emission surface 31b of the main body portion 38 are flatter than the reflection surface 36. This configuration allows the user to visually recognize the outside world with less discomfort as illustrated in FIG. 14. Therefore, it is possible to support augmented reality (AR) in which virtual visual information is superimposed on real scenery and displayed. The term "the refractive indexes of the main body portion 38 and the cover portion 39 are substantially the same" means that the refractive indexes are the same to such an extent that the user can visually recognize the outside world with less discomfort, and means that the difference between the refractive indexes is 0.05 or less.

In the second embodiment, the surface 39a of the cover portion 39 and the emission surface 31b of the main body portion 38 are substantially parallel to each other and are substantially flat surfaces. This configuration allows the user to visually recognize the outside world with far less discomfort. Note that the surface 39a of the cover portion 39 may be a concave curved surface or a convex curved surface according to the correction power in order to correct the vision of the user. Therefore, the term "the surface 39a of the cover portion 39 is a substantially flat surface" includes a case in which the surface 39a is curved to the extent of vision correction, and means that the surface 39a is a flat surface to such an extent that the user can visually recognize the outside world with less discomfort. The term "the surface 39a of the cover portion 39 and the emission surface 31b of the main body portion 38 are substantially parallel to each other" means that they are parallel to each other to such an extent that the user can visually recognize the outside with less discomfort even when the surface 39a of the cover portion 39 is curved to the extent that corrects vision.

Further, as in the second embodiment, the cover portion 39 preferably covers both the reflection surfaces 32 and 36. This configuration reduces a sense of discomfort at the boundary between the reflection surfaces 32 and 36 when the user views the outside world.

In the second embodiment, the main body portion 38 may be integrally formed as a whole, or a first portion 38a formed of the substantially flat reflection surface and a second portion 38b having the free-curved reflection surface 36 may be separately formed and then bonded together. Since the first portion 38a and the second portion 38b are bonded to each other after being molded using separate molds, ease of manufacturing is improved. On the other hand, mass productivity is improved by integrally forming the main body portion 38 as a whole.

Third Embodiment

Figure 15:
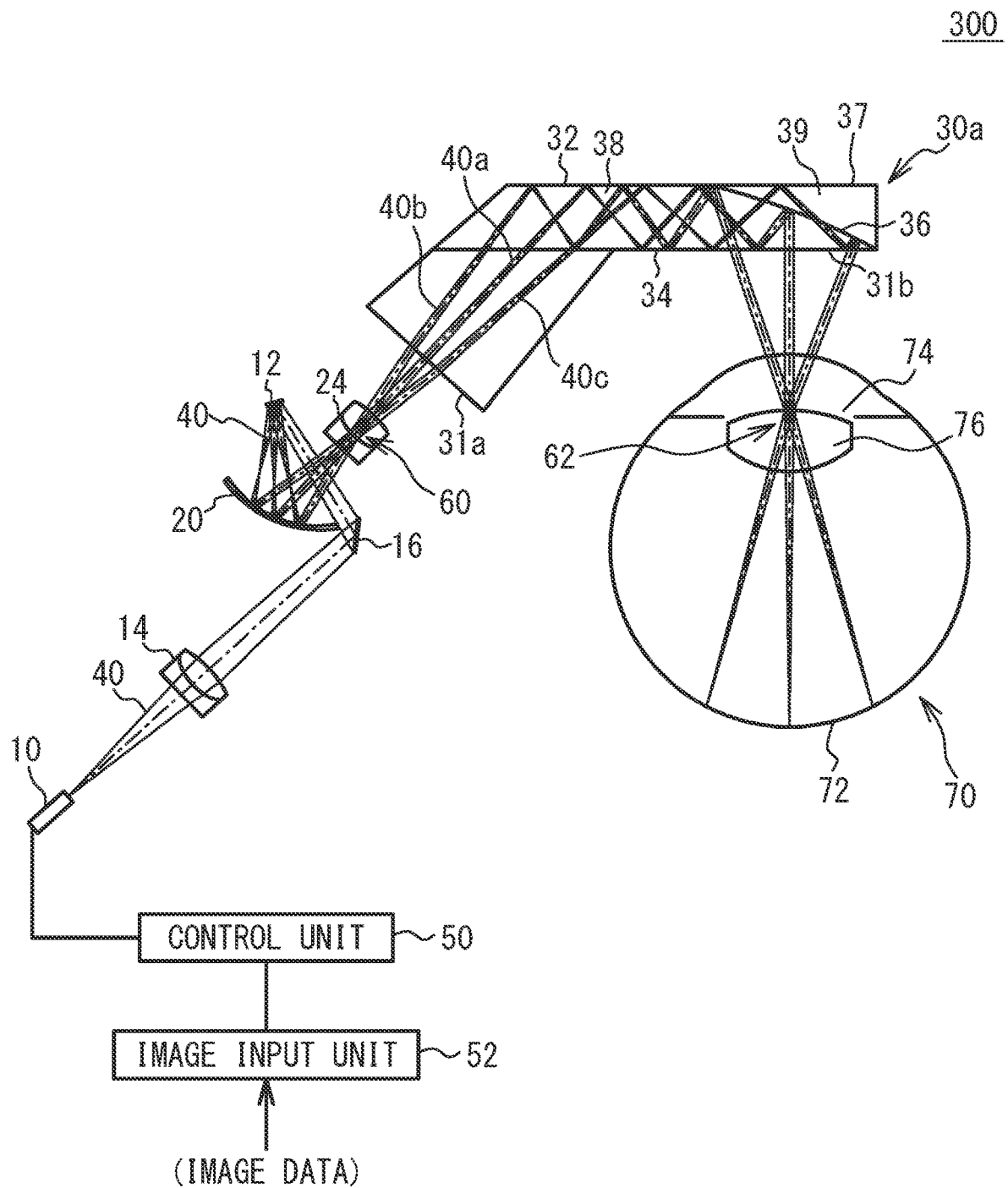
FIG. 15 illustrates an image projection device in accordance with a third embodiment.

FIG. 15 illustrates an image projection device 300 in accordance with a third embodiment. In the image projection device 300 of the third embodiment, as illustrated in FIG. 15, the light guide member 30a includes the main body portion 38 and the cover portion 39 as in the second embodiment. Similarly to the second embodiment, the main body portion 38 includes the reflection surface 34 located closer to the eye 70 of the user, and the reflection surface 32 located farther from the eye 70 of the user and on which the plurality of the laser beams 40 are incident before entering the last reflection surface 36. The difference from the second embodiment is that the cover portion 39 has a reflection surface 37 at the opposite side from the emission surface 31b of the main body portion 38 with respect to the reflection surface 36. The reflection surface 37 is a flat surface similar to the reflection surfaces 32 and 34, and is substantially flush with the reflection surface 32. The reflection surfaces 32, 34, 36 and 37 all reflect a part of the incident laser beam 40 and transmit the remainder. The plurality of the laser beams 40 are reflected by the plurality of the reflection surfaces 32, 34, 36, and 37 the same number of times and are applied to the eye 70.

The number of reflections of the laser beam 40 in the light guide member 30a increases when the light guide member 30a is thinned, the light guide member 30 protrudes in the lateral direction to reduce interference with the user's face, and/or the viewing angle is secured. In this case, when the plurality of the laser beams 40 are converged at the convergence point 62, some laser beams 40c of the plurality of the laser beams 40 enter the reflection surface 36 from the side of the eye 70, pass through the reflection surface 36, are reflected by the reflection surface 37 of the cover portion 39, then enter again the reflection surface 36 from the opposite side (opposite surface) from the eye 70, pass through the reflection surface 36, are reflected by the reflection surface 34, and are then reflected by the reflection surface 36 to be applied to the eye 70. The remaining laser beams 40a and 40b of the plurality of the laser beams 40 are reflected by the reflection surface 36 without passing through the reflection surface 36, and are applied to the eye 70. Although not illustrated, some of the laser beams 40a and 40b also pass through the reflection surface 36, but this light is not applied to the retina 72 and thus does not need to be considered.

In order to reduce the variation in luminance on the image projected on the retina 72, it is preferable to reduce the difference between the luminance of the laser beams 40a and 40b that do not pass through the reflection surface 36 and are reflected by the reflection surface 36 and applied to the eye 70 and the luminance of the laser beam 40c that is reflected by the reflection surface 36 after passing through the reflection surface 36 and applied to the eye 70 when they enter the eye 70. On the other hand, the light intensity of the laser beams 40a to 40c incident on the eye 70 is preferably large to some extent. When the outside world is viewed through the light guide member 30a, the transmittance of the light guide member 30a is preferably about 10% to 30%. A method for achieving the above configurations will be described below.

In the following description, it is assumed that the laser beams 40a to 40c are reflected four times in total by the reflection surfaces 32, 34, and 37, and are applied to the eye 70 by the fifth reflection by the last reflection surface 36. Reflectance and the like of each surface are specified as follows. For simplification, it is assumed that the sum of the transmittance and the reflectance of the same surface is 1 (transmittance+reflectance=1).

Incident light intensity of the laser beams 40a to 40c to the incident surface 31a: Pi
Transmittance of the incident surface 31a: Tp
Reflectance of the incident surface 31a: Rp (=1−Tp)
Transmittance of the reflection surface 34: Ta
Reflectance of the reflection surface 34: Ra (=1−Ta)
Transmittance of the reflection surface 32: Tb
Reflectance of the reflection surface 32: Rb (=1−Tb)
Transmittance of the reflection surface 36: Tc
Reflectance of the reflection surface 36: Rc (=1−Tc)
Transmittance of the reflection surface 37: Td
Reflectance of the reflection surface 37: Rd (=1−Td)

In this case, the light intensity Pcr when the eye 70 is irradiated with the laser beams 40a and 40b that are reflected by the reflection surface 36 without passing through the reflection surface 36 is calculated as follows.

$$Pcr = Pi \times Tp \times Ta \times Rb \times Ra \times Rb \times Ra \times Rc \times Ta \quad (1)$$

On the other hand, the light intensity Pct when the eye 70 is irradiated with the laser beam 40c that passes through the reflection surface 36, enters the reflection surface 36 again, and is reflected by the reflection surface 36 is calculated as follows.

$$Pct = Pi \times Tp \times Ta \times Rb \times Ra \times Tc \times Rd \times Tc \times Ra \times Rc \times Ta \quad (2)$$

Here, for simplification, it is assumed that the transmittance Tp of the incident surface 31a is 1. In this case, the expressions (1) and (2) can be modified as follows.

$$Pcr/Pi = Ta \times Rb \times Ra \times Rb \times Ra \times Rc \times Ta \quad (3)$$

$$Pct/Pi = Ta \times Rb \times Ra \times Tc \times Rd \times Tc \times Ra \times Rc \times Ta \quad (4)$$

In order to reduce variation in luminance on the image projected on the retina 72, expression (3)/expression (4) is preferably close to 1. In addition, since the expressions (3) and (4) are ratios of the intensity of the light with which the eye 70 is irradiated to the intensity of the incident light, the expressions (3) and (4) are preferably large.

The fact that expression (3)/expression (4) is close to 1 is expressed as follows.

$$Pcr/Pct = Rb/(Tc \times Rd \times Tc) \approx 1 \quad (5)$$

Here, since the reflection surface 32 and the reflection surface 37 are the same continuous surface and the user views the outside world through the reflection surface 32 and the reflection surface 37, the reflectances are preferably substantially the same. Therefore, in the following description, it is assumed that Rb=Rd. In this case, the expression (5) becomes as follows.

$$Pcr/Pct = Tc^2 \approx 1 \quad (5')$$

Tc=1 means that the reflectance on the reflection surface 36 is 0 and the laser beams 40a to 40c are not reflected by the reflection surface 36 and are not projected onto the retina 72. Therefore, it is preferable to set Tc to a value smaller than 1 while considering the balance.

Here, when the user views the outside world through the light guide member 30a for, for example, augmented reality (AR) or the like, light from the outside world reaches the eye 70 of the user through the reflection surfaces 32 and 37, the reflection surface 36, and the reflection surface 34. In sunglasses, it is generally said that the transmittance of light from the outside world is suitably about 10% to 30%. The transmittance Tar of the reflection surfaces 32 and 37, the reflection surface 36, and the reflection surface 34 is expressed as follows.

$$Tar = Td \times Tc \times Ta = (1-Rd) \times (1-Rc) \times (1-Ra) \quad (6)$$

Based on the above, the ranges of Ra, Rb, Rc, Rb, Rc, and Rd are presented below.

[Range of Rc]

Figure 16:
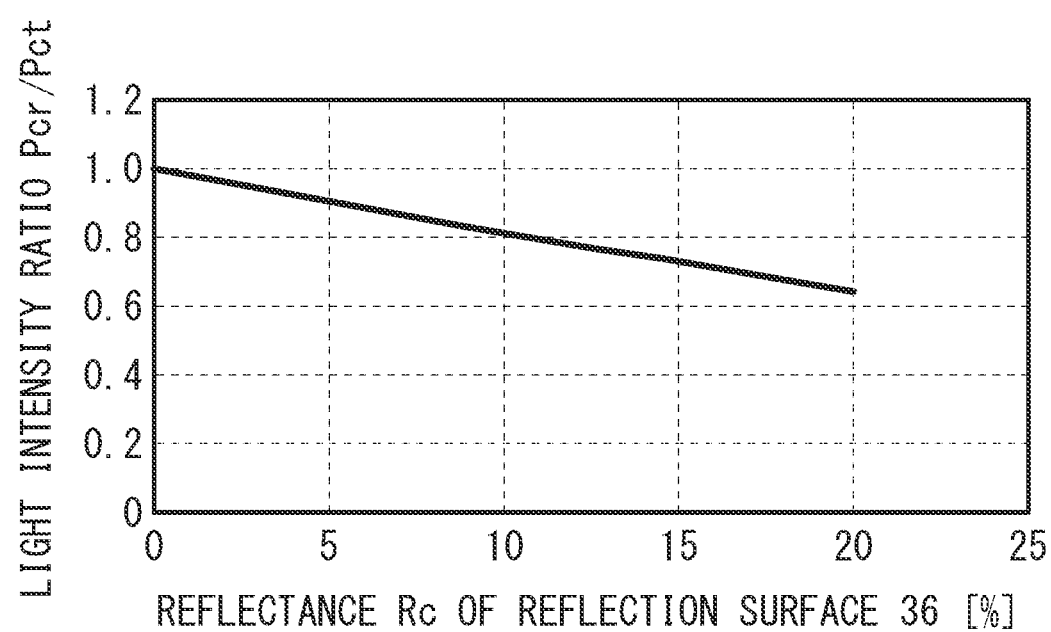
FIG. 16 is a graph presenting a relationship between a reflectance Rc and a light intensity ratio Pcr/Pct.

It is known that a luminance difference of about 70% to 80% cannot be recognized so much as human visibility. $Tc^2$ in the expression (5') can be transformed into $(1-Rc)^2$, and $Pcr/Pct = (1-Rc)^2$ can be represented by a graph as illustrated in FIG. 16. It can be seen from FIG. 16 that the range of Rc is preferably as follows in order to reduce the luminance difference to about 70% to 80%.

$$Rc \leq 15\%$$

[Range of Ra]

As described above, from the viewpoint of the intensity of the light with which the eye 70 is irradiated, the expression (3) is preferably large. Rc in the expression (3) has the above-mentioned restriction, and Rb will be described later, but at least $Ta \times Ra \times Ra \times Ta = (1-Ra)^2 \times Ra^2$ included in the expression (3) is preferably large. In this case, since the maximum value is obtained when Ra=0.5, it can be said that the range of Ra is preferably as follows.

$$45\% \leq Ra \leq 55\%$$

[Range of Rb]

Figure 17A:
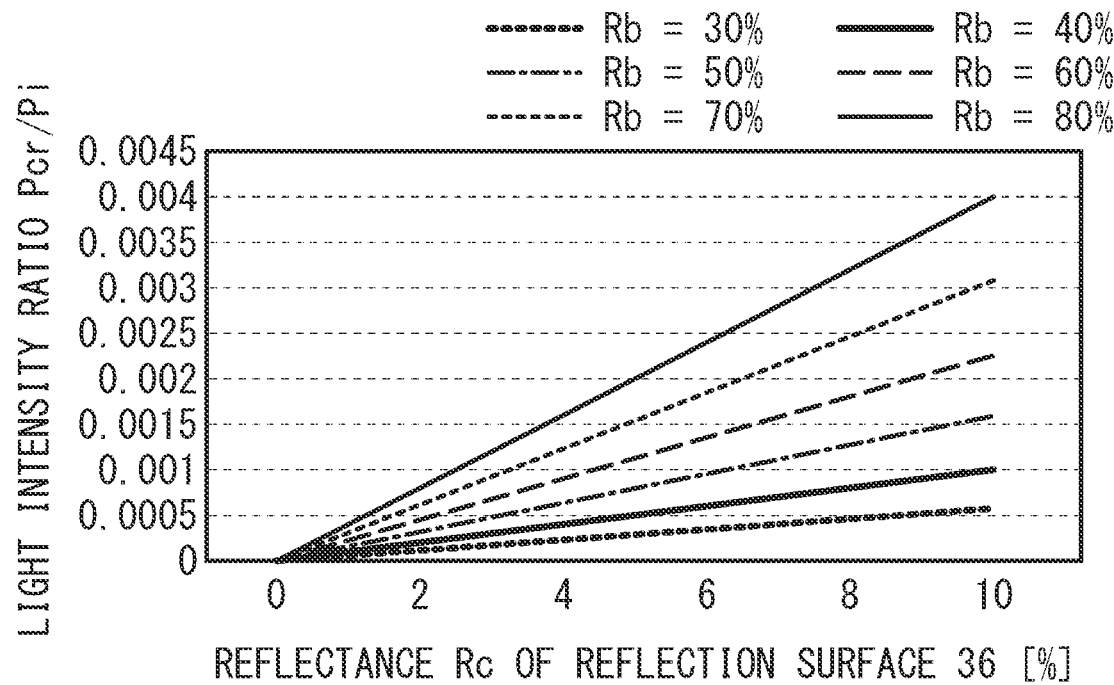
FIG. 17A is a graph presenting relationships between the reflectance Rc and a light intensity ratio Pcr/Pi.

FIG. 17A presents relationships between Rc and Pcr/Pi when Ra is fixed to 50% and Rb is varied to 30%, 40%, 50%, 60%, 70%, and 80% in the expression (3). As described above, since the expression (3) indicates the ratio of the intensity of the light with which the eye 70 is irradiated to the intensity of the incident light, the expression (3) is preferably large. Even when the laser output of the light source 10 is several mW and the intensity of the light with which the eye 70 is irradiated is attenuated to about 1/10000 of several mW, the ratio of the intensity of the light with which the eye 70 is irradiated to the intensity of the incident light is preferably about 0.1%. Therefore, from FIG. 17A, it can be said that Rb preferably satisfies Rb≥50%.

Figure 17B:
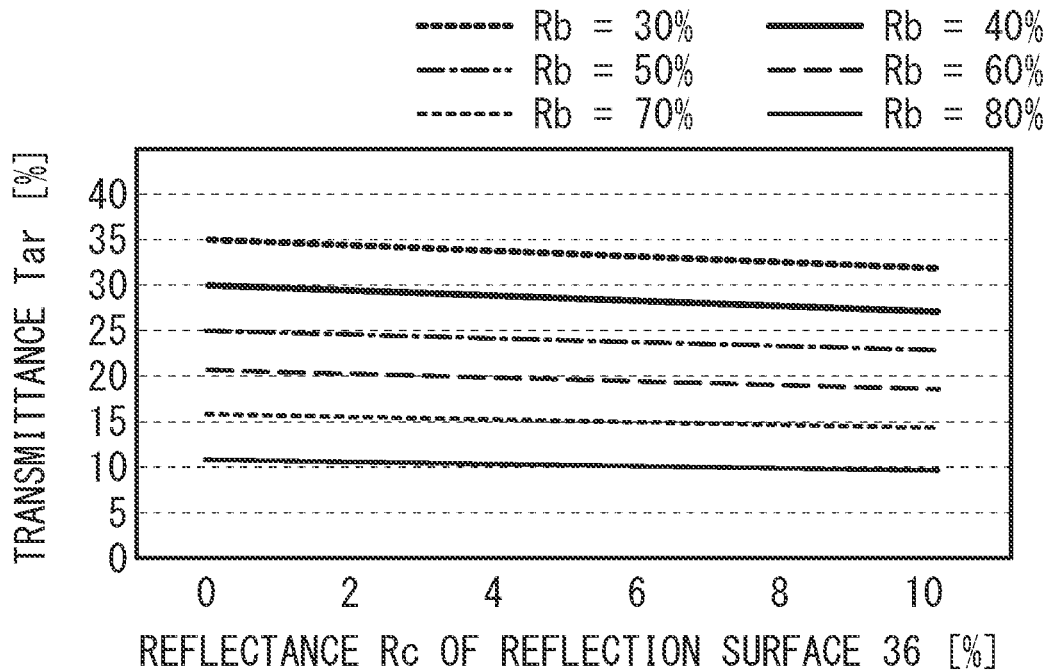
FIG. 17B is a graph presenting relationships between the reflectance Rc and a transmittance Tar.

FIG. 17B presents relationships between Rc and Tar when Ra is fixed to 50% and Rb is varied to 30%, 40%, 50%, 60%, 70%, and 80% in the expression (6). As described above, the transmittance of light from the outside is suitably about 10% to 30%. Therefore, from FIG. 17B, it can be said that Rb preferably satisfies 40%≤Rb≤70%.

Therefore, it can be said from FIG. 17A and FIG. 17B that the range of Rb is preferably as follows.

$$50\% \leq Rb \leq 70\%$$

In addition, as described above, since the user views the outside world through the reflection surface 32 and the reflection surface 37 that are continuous surfaces, Rb and Rd are preferably equal to each other. Therefore, it can be said that the range of Rd is preferably as follows.

$$50\% \leq Rd \leq 70\%$$

From the above,

Range of the reflectance Ra of the reflection surface 34 (a first reflection surface): 45%≤Ra≤55%

Range of the reflectance Rb of the reflection surface 32 (a second reflection surface): 50%≤Rb≤70%

Range of the reflectance Rc of the reflection surface 36 (a last reflection surface): 5%≤Rc≤15%

Range of the reflectance Rd of the reflection surface 37 (a third reflection surface): 50%≤Rd≤70% can be said to be preferable.

In the third embodiment, some laser beams 40c of the plurality of laser beams 40 enter the reflection surface 36 again after passing through the reflection surface 36, are reflected by the reflection surface 36, and are applied to the retina 72, and the remaining laser beams 40a and 40b are reflected by the reflection surface 36 without passing through the reflection surface 36, and are applied to the retina 72. In this case, when the laser beams 40a to 40c enter the eye 70, the ratio of the luminance of the laser beam 40c to the luminance of the laser beams 40a and 40b is set to 80% or greater. This configuration can reduce a variation in luminance on the image projected on the retina 72.

The reflectance Rc of the reflection surface 36 is set to 15% or less. By setting the reflectance Rc of the reflection surface 36 to 15% or less, as illustrated in FIG. 16, the luminance difference between the laser beam 40c that is reflected by the reflection surface 36 after passing through the reflection surface 36 and the laser beams 40a and 40b that are reflected by the reflection surface 36 without passing through the reflection surface 36 can be reduced to about 70%. Therefore, it is possible to reduce a variation in luminance on the image projected on the retina 72. In order to reduce the luminance difference, Rc is preferably 13% or less, more preferably 12% or less, and further preferably 10% or less. On the other hand, if Rc becomes too small, the reflection amount of the laser beam 40 on the reflection surface 36 becomes small, and in order to secure the light intensity of the laser beam 40 applied to the eye 70, for example, the output of the light source 10 is increased. Therefore, Rc is preferably 5% or greater, more preferably 8% or greater, and further preferably 10% or greater.

The reflectance Rb of the reflection surface 32 and the reflectance Rd of the reflection surface 37 are adjusted to be substantially the same. This configuration can make luminance difference among the laser beams 40a to 40c depending on presence or absence of reflection by the reflection surface 37 small even in a case in which the laser beams 40a and 40b are not reflected by the reflection surface 37 and the laser beam 40c is reflected by the reflection surface 37. The term "substantially the same" means that the ratio of the reflectance Rd of the reflection surface 37 to the reflectance Rb of the reflection surface 32 is 95% to 105%, and may be 98% to 102%.

The reflectance Rb of the reflection surface 32 and the reflectance Rd of the reflection surface 37 are adjusted to be 40% or greater and 70% or less. This configuration allows the outside world to be viewed with appropriate brightness when the outside world is viewed through the light guide member 30a in AR or the like.

The reflectance Ra of the reflection surface 34 is preferably 45% or greater and 55% or less, the reflectances Rb and Rd of the reflection surfaces 32 and 37 are preferably 50% or greater and 70% or less, and the reflectance Rc of the reflection surface 36 is preferably 5% or greater and 15% or less in order to reduce the luminance difference among the plurality of the laser beams 40 applied to the eye 70 to be small, ensure a large light intensity of the laser beams 40 incident on the eye 70, and ensure visibility of the outside world through the light guide member 30a.

In the first embodiment and the second embodiment, the reflection mirror 20 may be another optical member such as a combination of a lens and a mirror or a diffraction element as long as the reflection mirror 20 has a positive condensing power and optical characteristics of converging and then diffusing the plurality of the laser beams 40.

In the first and second embodiments, the lens 24 may have a function of reducing chromatic aberration. In addition, the lens 24 is preferably designed to reduce curvature of image. The lens 24 may be another optical member such as a mirror or a diffraction element as long as the lens 24 can cause the laser light 40 to enter the reflection surface 36 of the light guide member 30 as diffusion light.

In the first embodiment and the second embodiment, the case in which the image projection device 100 is attached to the spectacle-type frame 90 has been described as an example. However, as long as the frame can be worn on the user's face and the image projection device 100 can be placed in front of the user's eye, the frame is not limited to the spectacle-type frame and may be another type such as a goggle-type frame, an eye-patch-type frame, an ear-hanging frame, or a helmet-mounted frame.

Although embodiments of the present invention have been described so far, the present invention is not limited to those particular embodiments, and various changes and modifications may be made to them within the scope of the invention claimed herein.

The invention claimed is:

1. An image projection device comprising:
 a light source;
 a control unit configured to generate an image light beam based on image data and control emission of the image light beam from the light source;
 a scanning unit that is attached to a frame to be worn on a face of a user and two-dimensionally scans the image light beam emitted from the light source;
 a light guide member that is attached to the frame and disposed in front of an eye of the user, is formed of a glass material through which a plurality of image light beams emitted from the scanning unit at different times pass, has a plurality of reflection surfaces that reflect the plurality of image light beams, converges the plurality of image light beams reflected by the plurality of reflection surfaces at a first convergence point in the eye of the user, and then irradiates a retina of the user with the converged image light beams;
 a first optical member that is attached to the frame and converges the plurality of image light beams emitted from the scanning unit at a second convergence point before the light guide member and then causes the plurality of image light beams to enter the light guide member; and
 a second optical member that is disposed at the second convergence point and causes each of the plurality of image light beams to enter a last reflection surface, which reflects the plurality of image light beams last among the plurality of reflection surfaces included in the light guide member, as diffusion light,
 wherein the scanning unit and the first optical member are attached near a temple of the frame,
 wherein the light guide member is attached near a rim of the frame and has a shape extending from a front of the eye of the user toward the temple, and
 wherein the light guide member has an odd number of reflection surfaces as the plurality of reflection surfaces, and the plurality of image light beams that are reflected by the first optical member and travel obliquely forward enter the light guide member.

2. The image projection device according to claim 1, wherein the last reflection surface of the plurality of reflection surfaces is a concave curved surface, and remaining reflection surfaces are substantially flat surfaces.

3. The image projection device according to claim 2, wherein the light guide member includes a main body portion through which the plurality of image light beams repeatedly reflected by the plurality of reflection surfaces and applied to the retina of the user pass, and a cover portion that covers the last reflection surface and has a refractive index substantially equal to that of the main body portion,
 wherein the last reflection surface, an emission surface through which the plurality of image light beams reflected by the last reflection surface are emitted from the main body portion, and an opposite surface of the cover portion from the emission surface of the main body portion with respect to the last reflection surface are located in front of the eye of the user,
 wherein the last reflection surface is a half mirror, and
 wherein the emission surface of the main body portion and the opposite surface of the cover portion are flatter than the last reflection surface.

4. The image projection device according to claim 3, wherein the emission surface of the main body portion and the opposite surface of the cover portion are substantially parallel to each other and are substantially flat surfaces.

5. The image projection device according to claim 1, wherein a convergence angle at which the plurality of image light beams converge at the first convergence point is equal to or greater than a scanning angle of the plurality of image light beams by the scanning unit.

6. The image projection device according to claim 1, wherein the image light beam emitted from the light source travels obliquely forward from a side closer to the face of the user than the scanning unit and enters the scanning unit, and
 wherein the plurality of image light beams emitted from the scanning unit travel rearward from the scanning unit, are then reflected obliquely forward by the first optical member to enter the light guide member.

7. The image projection device according to claim 1, wherein some image light beams of the plurality of image light beams pass through the last reflection surface, then enter again an opposite surface of the last reflection surface and pass through the last reflection surface, are reflected by the last reflection surface, and are applied to the retina of the user, and remaining image light beams of the plurality of image light beams are reflected by the last reflection surface without passing through the last reflection surface, and are applied to the retina of the user, and
 wherein a ratio of luminance of the some image light beams to luminance of the remaining image light beams is 80% or greater when the image light beams enter the eye of the user.

8. The image projection device according to claim 1, wherein some image light beams of the plurality of image light beams pass through the last reflection surface, then enter an opposite surface of the last reflection surface and pass through the last reflection surface, are reflected by the last reflection surface, and are applied to the retina of the user, and remaining image light beams of the plurality of image light beams are reflected by the last reflection surface without passing through the last reflection surface, and are applied to the retina of the user, and wherein the reflectance of the last reflection surface is 15% or less.

9. An image projection device comprising:
a light source;
a control unit configured to generate an image light beam based on image data and control emission of the image light beam from the light source;
a scanning unit that is attached to a frame to be worn on a face of a user and two-dimensionally scans the image light beam emitted from the light source;
a light guide member that is attached to the frame and disposed in front of an eye of the user, is formed of a glass material through which a plurality of image light beams emitted from the scanning unit at different times pass, has a plurality of reflection surfaces that reflect the plurality of image light beams, converges the plurality of image light beams reflected by the plurality of reflection surfaces at a first convergence point in the eye of the user, and then irradiates a retina of the user with the converged image light beams;
a first optical member that is attached to the frame and converges the plurality of image light beams emitted from the scanning unit at a second convergence point before the light guide member and then causes the plurality of image light beams to enter the light guide member; and
a second optical member that is disposed at the second convergence point and causes each of the plurality of image light beams to enter a last reflection surface, which reflects the plurality of image light beams last among the plurality of reflection surfaces included in the light guide member, as diffusion light,
wherein a first reflection surface immediately before the last reflection surface among the plurality of reflection surfaces has a region on which both the plurality of image light beams reflected by a second reflection surface immediately before the first reflection surface and the plurality of image light beams reflected by the last reflection surface are incident, and reflects the plurality of image light beams reflected by the second reflection surface to the last reflection surface and transmits the plurality of image light beams reflected by the last reflection surface in the region.

10. The image projection device according to claim 9, wherein the first reflection surface is substantially orthogonal to an optical axis after a central image light beam corresponding to a center of an image projected on the retina of the user among the plurality of image light beams is reflected by the last reflection surface.

11. The image projection device according to claim 9, wherein a first optical path length, a second optical path length, a third optical path length, and a fourth optical path length are shorter in this order, where the first optical path length is an optical path length of the image light beam between the second reflection surface and an incident surface through which the image light beam enters the light guide member, the second optical path length is an optical path length of the image light beam between the second reflection surface and the first reflection surface, the third optical path length is an optical path length of the image light beam between the first reflection surface and the last reflection surface, and the fourth optical path length is an optical path length of the image light beam between the last reflection surface and the first reflection surface as an emission surface of the light guide member.

12. The image projection device according to claim 9, wherein an incident angle at which the image light beam enters the first optical member is substantially the same as an incident angle at which the image light beam enters the last reflection surface, and an incident angle at which the image light beam enters the second reflection surface is substantially the same as an incident angle at which the image light beam enters the first reflection surface.

13. An image projection device comprising:
a light source;
a control unit configured to generate an image light beam based on image data and control emission of the image light beam from the light source;
a scanning unit configured to two-dimensionally scan the image light beam emitted from the light source; and
a light guide member that is formed of a glass material through which the plurality of image light beams emitted from the scanning unit at different times pass, has a plurality of reflection surfaces that reflect the plurality of image light beams, converges the plurality of image light beams reflected by a last reflection surface, which reflects the plurality of image light beams last among the plurality of reflection surfaces, at a convergence point in an eye of a user, and then irradiates a retina of the user with the converged image light beams,
wherein some image light beams of the plurality of image light beams pass through the last reflection surface, then enter again an opposite side of the last reflection surface and pass through the last reflection surface, are reflected by the last reflection surface, and are applied to the retina of the user, and remaining image light beams of the plurality of image light beams are reflected by the last reflection surface without passing through the last reflection surface, and are applied to the retina of the user, and
wherein the last reflection surface has a reflectance of 15% or less.

14. The image projection device according to claim 13, wherein the plurality of reflection surfaces have a first reflection surface located closer to the eye of the user, a second reflection surface that is located farther from the eye of the user and on which the plurality of image light beams are incident before entering the last reflection surface, and a third reflection surface on which the plurality of image light beams are incident after passing through the last reflection surface, and
wherein a reflectance of the second reflection surface and a reflectance of the third reflection surface are substantially equal to each other.

15. The image projection device according to claim 14, wherein the reflectance of the second reflection surface and the reflectance of the third reflection surface are 40% or greater and 70% or less.

16. The image projection device according to claim 14, wherein a reflectance of the first reflection surface is 45% or greater and 55% or less,
wherein the reflectance of the second reflection surface and the reflectance of the third reflection surface are 50% or greater and 70% or less, and
wherein the reflectance of the last reflection surface is 5% or greater and 15% or less.

17. The image projection device according to claim 13, wherein the plurality of image light beams are reflected by the plurality of reflection surfaces the same number of times and are applied to the retina of the user.

* * * * *